United States Patent
Brouillette et al.

(10) Patent No.: US 8,430,956 B2
(45) Date of Patent: Apr. 30, 2013

(54) STABILIZATION OF SOILS USING A PROPORTIONAL LIME SLURRY

(75) Inventors: Fred Brouillette, Colleyville, TX (US); Clifford Ryan, Savannah, TX (US); Yon Martin Robinson, Burleson, TX (US)

(73) Assignee: Texas Industries, Inc., Dallas, TX (US)

( * ) Notice: Subject to any disclaimer, the term of this patent is extended or adjusted under 35 U.S.C. 154(b) by 79 days.

(21) Appl. No.: 13/205,227

(22) Filed: Aug. 8, 2011

(65) Prior Publication Data

US 2011/0311308 A1    Dec. 22, 2011

Related U.S. Application Data

(63) Continuation-in-part of application No. 11/837,764, filed on Aug. 13, 2007, now Pat. No. 7,993,451.

(51) Int. Cl.
*C04B 2/00* (2006.01)
(52) U.S. Cl.
USPC .......... 106/792; 106/795; 427/403; 427/419.2
(58) Field of Classification Search .................. 106/792, 106/795; 423/635; 427/403, 419.2
See application file for complete search history.

(56) References Cited

U.S. PATENT DOCUMENTS

| | | | |
|---|---|---|---|
| 2,427,683 A | 9/1947 | Ludwig | |
| 2,629,667 A | 2/1953 | Herman | |
| 3,483,007 A | 12/1969 | Hook | |
| 3,498,809 A | 3/1970 | Anderson | |
| 4,210,455 A | 7/1980 | Metcalf et al. | |
| 4,470,463 A | 9/1984 | Holland | |
| 4,478,640 A | 10/1984 | Holland | |
| 4,935,060 A | 6/1990 | Dingsoyr | |
| 5,447,197 A | 9/1995 | Rae et al. | |
| 5,547,506 A | 8/1996 | Rae et al. | |
| 6,220,354 B1 | 4/2001 | Chatterji et al. | |
| 6,500,252 B1 | 12/2002 | Chatterji et al. | |
| 6,511,537 B1 | 1/2003 | Barlet-Gouedard et al. | |
| 6,613,142 B1 | 9/2003 | D'Almeida et al. | |
| 7,353,870 B2 | 4/2008 | Roddy et al. | |
| 7,993,451 B2 * | 8/2011 | Brouillette et al. | 106/729 |

(Continued)

FOREIGN PATENT DOCUMENTS

| | | |
|---|---|---|
| CA | 2110658 | 6/1994 |
| CA | 2691670 | 1/2009 |

OTHER PUBLICATIONS

Portland Cement Association Advertisement Supplement, "The Road Recycled: Full-Depth Reclamation with Cement"—2006.

(Continued)

*Primary Examiner* — Paul Marcantoni
(74) *Attorney, Agent, or Firm* — Locke Lord, LLP

(57) ABSTRACT

A novel method and composition of high solid content lime slurry composed of a lime material and water that can be used in stabilization applications. The lime slurry compound itself is chemically treated, by means of a cellulosic or other thixotropic agent(s) and sucrose to create a thixotropic flow property controlled system wherein the wetted lime material remains in suspension, does not settle out prior to use even without further mixing and maintains suitable temperatures without excessive heat build. A novel apparatus and method for mixing the novel lime slurry is disclosed to insure the exact proportioning of all ingredients and the proper wetting of the lime material.

51 Claims, 11 Drawing Sheets

U.S. PATENT DOCUMENTS

2007/0056734 A1  3/2007  Roddy et al.
2009/0011207 A1  1/2009  Dubey
2009/0197991 A1  8/2009  Bury et al.

OTHER PUBLICATIONS

National Lime Association, Mixture Design and Testing Procedures for Lime Stabilized Soil, Technical Brief, Oct. 2006, Arlington, VA, www.lime.org.

National Lime Association, Lime Treated Soils Save Time & Money, Technical Digest, 2005, Arlington, VA, www.lime.org.

Mallela, Jagannath; Quintus, P.E., Harold Von; Smith, Kelly L.; Consideration of Lime-Stabilized Layers in Mechanistic-Empirical Pavement Design, Technical Brief, Jun. 2004.

National Lime Association, Lime Stabilization & Lime Modification, Lime-Treated Soil Construction Manual, Jan. 2004, Bulletin 326, Arlington, VA.

* cited by examiner

STABILIZATION OF SOILS USING A PROPORTIONAL LIME SLURRY

RELATED APPLICATIONS

This application is a continuation-in-part of U.S. application Ser. No. 11/837,764 filed on Aug. 13, 2007 and entitled "Cement Stabilization of Soils Using a Proportional Cement Slurry."

BACKGROUND OF THE INVENTION

1. Field of Use

The invention relates to the use of lime based compounds to stabilize and condition substrate soils and, more particularly, to the use of a novel method and composition of lime slurry that remains in homogeneous suspension without destructive heat gains in a controlled manner.

2. Related Art

In the construction industry, a stable rigid base is required for paving, building and parking structures, which requires the stabilization of the substrate soil. This stabilization may be accomplished by combining cement with the soil. Combinations of cement and soil are referred to as, but not limited to, soil cement, cement treated base, cement stabilized soil, and cement treated soil. The creation of soil cement involves the addition of specified amounts of cement per cubic unit of soil. The aforementioned soil is then graded and compacted to meet requirements specified in job plans and drawings. The cement treated soils are then allowed to cure, a chemical process whereby the cohesive material gains in strength and rigidity over time.

In other cases, lime may be used to treat the soil to form a stabilized base for paving, building and parking structures. Lime can be used in the form of quicklime (calcium oxide—CaO), hydrated lime (calcium hydroxide—$Ca[OH]_2$) or lime slurry. Quicklime is manufactured by chemically converting limestone (calcium carbonate—$CaCO_3$) into calcium oxide. Hydrated lime is created when quicklime chemically reacts with water. Lime slurry is a suspension of hydrated lime in water and can be formed from either hydrated lime or quicklime. Most lime material used for soil treatment is "high calcium" lime, which contains no more than 5 percent magnesium oxide or hydroxide. On some occasions, "dolomitic" lime is used. Dolomitic lime contains 35-46 percent magnesium oxide or hydroxide. Dolomitic lime can perform well in soil stabilization, although the magnesium fraction reacts more slowly than the calcium fraction. Lime is also sometimes used to describe byproducts of the lime manufacturing process (such as lime kiln dust), which do have as much reactive lime as the manufactured product but can still be used as a lime material to treat and stabilize a base for paving.

Lime materials can be used to treat the soil of the base in a number of ways. Quicklime, because it chemically combines with water, can be used to dry wet soils. When clays are present, hydrated lime will also chemically react with clay particles to provide further drying of the soil as well as chemically transforming them into a strong cementitious mix. After the initial mixing, the calcium ions ($Ca^{++}$) from hydrated lime migrate to the surface of the clay particles and displace water and other ions. As a result, the soil becomes friable and granular, making it easier to work and compact. The Plasticity Index of the soil decreases dramatically as does its tendency to swell and shrink. When sufficient lime is added to raise the pH of the soil to above 10.5, clay particles will start to break down. Silica and alumina are released and react with calcium from the lime to form calcium-silicate-hydrates (CSH) and calcium-aluminate-hydrates (CAH). CSH and CAH are cementitious products similar to those formed in Portland cement. They form a matrix that contributes to the strength of lime-stabilized soil layers. As this matrix is formed, the soil is transformed from a sandy, granular material to a hard, relatively impermeable layer with significant load bearing capacity. The matrix formed is permanent, durable, and significantly impermeable, producing a structural layer that is both strong and flexible. As a result, in some cases lime may be used instead of cement to stabilize the substrate soil in preparation for paving or other construction.

Lime by itself can react with soils containing as little as 7 percent clay and Plasticity Indexes as low as 10. If the soil is not sufficiently reactive, lime can be combined with an additional source of silica and alumina. Such "pozzolans" include fly ash, and ground blast furnace slag. Fly ash is the most commonly used pozzolan. It is the finely divided residue that results from the combustion of pulverized coal in power plant boilers, which is transported from the combustion chamber by exhaust gases. Use of Lime Kiln Dust (LKD), which is the finely divided residue from the combustion of coal and the processing of limestone into lime in a lime kiln, is an increasingly popular alternative. LKD usually contains a significant amount of lime, alumina, and silica and thus is in essence a preblended mix of lime and pozzolan. Alkaline bypass dust (ABD) is a waste product from the cement manufacturing process in the clinker cooling phase of production that is very high in calcium oxide, but also contains some cement that will cure on its own. This provides ABD the benefits of lime treatment of the soil, while also creating soil cement.

One method commonly used to create cement or lime treated soil is a dry method. This generally involves using a pneumatic pumping apparatus to blow dry cement or lime onto a soil substrate and then mixing it into the soil. While commonly used, this process is considered undesirable due to the large amount of dust created by the blowing of fine cement or lime powder. This is especially undesirable in more populated areas. While using quicklime can minimize the dust creation problem to some extent, the fact that it requires 32 percent of its weight in water to convert to hydrated lime creates additional processing and handling concerns especially where drying is not required or there is no convenient water supply.

Another method to create soil cement or lime treated soil is to use a slurry. Cement/lime slurry is basically powdered cement or lime blended in water. There are various known methods for creating such slurries. The slurry preparation is placed over a substrate soil and then mixed in using mechanical means. Slurries are seen as a more desirable method of treatment than that of dry methods. However, slurry methods have proven to be very problematic in use. Cement slurry will harden in shipping vehicles if not removed in a timely manner. In addition, the cement or lime itself will start to separate or fall out of solution almost immediately after mixing with water. While lime slurries do not set, there is no fineness specification for lime products so they can have a very wide variety of particle sizes. This makes it more difficult to keep the lime suspended in the slurry. Lime slurries have been effectively limited to 35-45% of solids (e.g. hydrated lime, LKD, ABD) in water, even when using continuous mechanical mixing.

Methods to overcome the propensity of cement and lime particles to precipitate inside transportation vehicles include drum mixing and recirculation pumps. Both methods involve mechanical means to keep the solution moving so as to prevent the cement or lime from settling within the shipping vehicle. Should settlement occur, the resulting segregation of the water and cement or lime particles make it impossible to properly regulate the dispersion of the binary solution. This event also creates a great deal of maintenance problems for the vehicle operator. As a result of these limitations and despite the lack of dust creation, the use of slurries tends to be rare. The problematic properties of slurry have significantly limited its use and made other stabilization methods more desirable.

In addition to the settling problem, lime reacts with the water present in the slurry to rapidly heat the slurry. This occurs within about fifteen to twenty minutes after mixing and can result in the water in the slurry boiling off. Without sufficient water the lime material will clump and harden hampering its ability to be dispersed on the soil to be treated. The heating can even form steam pockets that in some cases have been known to blow the access hatch off a mixing truck that is being used to mix the slurry.

The conventional way to deal with this excess heat issue is to continue adding additional water to ensure a very high excess of water is always present. However, this results in lower and less consistent amounts of solids content in the final slurry. Since the final slurry has a less consistent amount of solids content from batch to batch, it is more difficult for the customer to reliably use the slurry to treat the base soil. The lower solids content leads to a viscosity for the slurry that is much closer to water, thus making it more difficult to keep the slurry from flowing out of position before it can be mechanically mixed into the soil. The excess water required to keep the lime in suspension also can raise the moisture level of the substrate soil above the desired range for creation of the treated base. Consequently, there is still a need for a composition and method to allow the use of lime slurries containing consistently high concentrations of solids.

As an alternative to using cement or lime to treat the soil base, a process called full depth reclamation can be used to provide a base for structures such as roads, parking lots, and other paved areas. This process involves grinding up and pulverizing the asphalt surface, cutting it to grade and blending it with the underlying base, subbase, and/or subgrade material. Cement and water is added to the combined materials to stabilize it much in the same way that cement can be added to substrate soil to created stabilized soil cement. Lime may also be used in this process to improve the properties of the soil/aggregate mixtures. The mixture is then compacted in place to form a stabilized substrate for the new paving. This process allows deteriorated roadways and other paved surfaces to be rebuilt without requiring lots of additional aggregate raw materials or having to cart away and dispose of the old asphalt and other materials. The process also allows roadways to be repaved and strengthened without changing the level of the grade, thereby avoiding issues where the pavement meets curbs and drain grates as well as avoiding changing the amount of clearance under overpasses on roadways. However, this process, because it involves the addition of cement and optionally lime to stabilize the base, runs into the same problems discussed above with respect to the application of cement and lime for soil stabilization.

While rare, thixotropic compounds have been occasionally used in connection with cement applications, although not in connection with soil cement slurries. Methylcellulose and related compounds have been used when pouring concrete underwater. In contrast to forming a gel and controlling hydration, the methylcellulose is added to increase internal cohesion and to thereby minimize the amount of concrete that is washed away by the surrounding water. This reduces the requirement that the structures be over engineered to account for the amount of sacrificial concrete that is washed away. Starch or other thickeners such as silica have been used in specific cement applications such as shotcrete, where dry or mixed concrete is sprayed onto walls and/or ceilings, and in thin set mortar. However, in these applications, the thickener is added to a mixture that is already very low in water content and viscosity, for purposes of increased self-adhesion, and does not lower the viscosity of a fluid, form a gel, reduce the tendency for disaggregation or settling out of suspended elements in a fluid, or increase the time before the mixture sets.

SUMMARY OF THE INVENTION

A first aspect of the invention is a novel method and composition of lime slurry for use in treating soils. The slurry is generally composed of a lime material (e.g. quicklime, hydrated lime or other lime containing material such as lime kiln dust or alkaline bypass dust) and water. The slurry compound itself is chemically treated, by means of a cellulosic or other thixotropic agent to create a thixotropic system wherein for a given amount of time the lime remains in suspension, does not settle out, maintains acceptable temperatures and controls the flow properties of the slurried lime material. Further, sucrose can be added to limit the temperature increase of the slurry to prevent the water from boiling off and to control the flow properties of the slurry. The stable thixotropic slurry compound does not require further mixing while in transit in order to keep the wetted lime in suspension. The proportion of lime, water, and admixtures is adjustable to the needs and requirements of various jobs. Slurries containing lime with much higher solids content that are fluid and stable than those of other methods can be achieved using the methods herein.

In another aspect of the invention, a novel apparatus and method for mixing the novel lime slurry is disclosed to insure the exact proportioning of all ingredients and the proper wetting of the lime. Through novel mechanical means the apparatus thoroughly wets and mixes specific weighted proportions of lime, water, thixotropic agent(s) and optionally de-foamer/anti-foamer(s). In a preferred embodiment, a mixing tank is filled with the amount of water required for the size and lime ratio for a particular batch. Sucrose or another agent is added to the water to reduce the water requirements, control the temperature and/or adjust the rheology of the slurry. Lime material is then injected into the mixing tank, such as by using a pneumatically pressurized pump, below the surface of the water in the tank. The water/slurry in the mixing tank is also circulated and is injected back into the mixing tank in close proximity to the lime injection point. Both the lime material and re-circulated streams are focused on a screen diffuser located within the mixing chamber. The lime material is wetted and broken up by the force created by the two streams colliding with the screen diffuser and recirculation through the main pump. This also create microstabilized pockets of air in the slurry. A thixotropic agent, preferably a cellulosic material is added to the mixture following the addition of lime, preferably using a water eductor to add the material to the circulating slurry. Additional admixtures can be added during this time. If necessary or desired, lime compatible de-foamer/anti-foamer can be added throughout the process to control the formation of excessive foam or excessive air entrainment within the slurry.

BRIEF DESCRIPTION OF DRAWINGS

The apparatus of the invention is further described and explained in relation to the following figures, wherein.

DETAILED DESCRIPTION OF THE PREFERRED EMBODIMENTS

Figure 1:
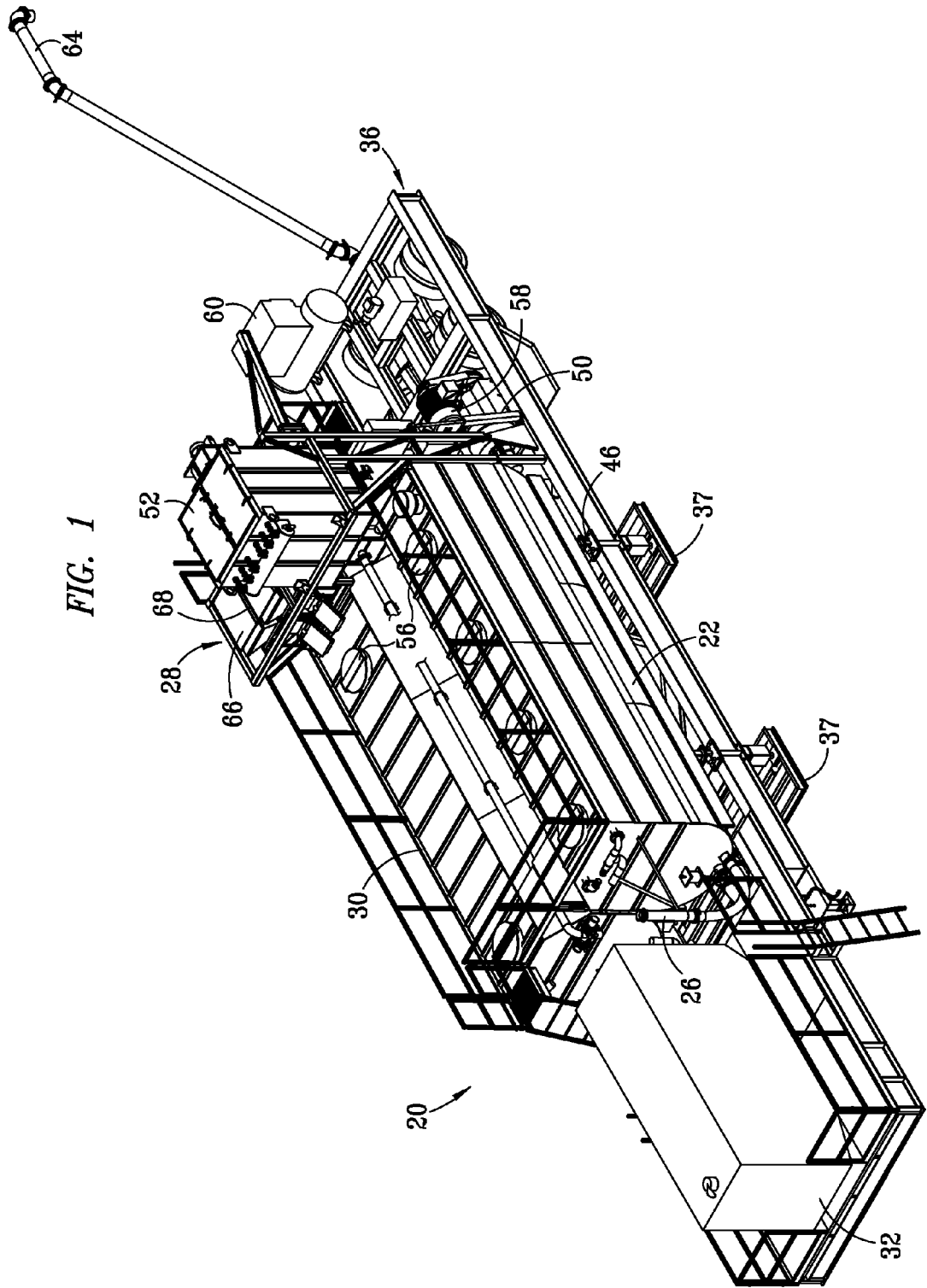
FIG. 1 is a front perspective view of a preferred trailer mounted mobile mixing apparatus that can be used to manufacture the novel slurry composition.

The lime slurry, method of manufacturing the lime slurry, and the apparatus used to manufacture the lime slurry may be better understood by the following discussion of various embodiments of the disclosed invention.

In a preferred embodiment, the novel lime slurry is composed of a lime material, water, sucrose and a cellulosic. The various components are mixed together sufficiently to create a homogeneous mixture wherein the lime is completely wetted and in suspension in the water without clumping or settling.

It is currently preferred that the lime slurry contain from about 60 to about 70 weight percent of the lime material solids and from about 40 to about 30 weight percent water. The lime material used herein includes all types of lime, including quick lime, hydrated lime, ABD, LKD, other lime containing materials as well as mixtures of one or more of the above compounds. Higher solid contents of lime containing materials are not preferred because they begin to render the slurry too stiff to use while lower concentrations render the slurry too fluid and difficult to control.

A thixotropic agent(s), preferably a cellulosic or another agent that contains cellulose or a cellulose derivative, is used in the slurry in an amount that is proportionate to the amount of lime material that is being used. The cellulosic or thixotropic agent is used to create a thixotropic system wherein for a given amount of time the wetted lime remains in suspension, does not settle out, and transports in a manner whereby the flow properties of the material are controlled for proper discharge onto substrate soils. The thixotropic thickener is a water retention agent that gels and in combination with sucrose controls the viscosity of the slurry. Thixotropic thickeners that can be useful in the current invention include cellulosic compounds such as methylhydroxyethyl cellulose, hydroxyethyl cellulose, other cellulose-containing thickeners, as well as non-cellulose thixotropic thickeners including starches, gums, agar-agar, alginate, guar flour, vinyl polymers, polyether, polyamides, polysilicic acid, clay, minerals, silica, and zeolite.

While any thixotropic thickener or rheology control agent can be used to suspend the lime particles in the slurry, cellulosic or other cellulose-containing thixotropic thickeners are especially preferred. Cellulose-containing thixotropic thickeners include: PAMs, which contain a modified version of cellulose; gorgum, which is a sugar based derivative of cellulose; cellulose ethers, and derivatives of cellulosic materials. Most thixotropic thickeners that are available for use in these applications are understood to either be a cellulosic, contain cellulose, or a derivative thereof; and therefore are considered cellulose-containing thixotropic thickeners. Without being bound to any theory, cellulose-containing thixotropic thickeners are believed to encapsulate the lime particles as well as retain water in a gel. This prevents the lime from prematurely reacting with the water as well as keeping the lime particles suspended in the slurry. Cellulose-containing thixotropic thickeners are also believed to advantageously release the retained water after a desired period of time, which allows the water to reach the lime particles after the slurry, is applied to the substrate in order to form the stabilized composition.

Depending on the procedure for introducing the cellulosic to the water and lime material, the cellulosic may be preferably surface treated. The surface treatment maintains the cellulosic as individual particles until the surface treatment wears away. The surface treatment will degrade due to mechanical abrasion as well as pH that is above 8. Lime like cement has a high pH, so the surface treatment begins to break down as soon as it contacts the slurry. As the surface treatment breaks down, the cellulosic reacts with the water that is present and raises the viscosity of the slurry. The same property of the cellulosic that raises the viscosity of the slurry is believed to help the lime remain suspended in the water by gelling to form a thioxotropic solution. If the cellulosic does not contain a surface treatment, it may not properly disperse but instead will form clumps of gel that have a powder center. The use of a water eductor to introduce the cellulosic to the slurry can be used to minimize the clumping of the cellulosic, thus avoiding the need to use a surface treated cellulosic. The majority of cellulosic products that are commercially available are already surface treated.

Cellulosic compounds useful in the current invention include methylhydroxyethyl cellulose, cellulose ethers, and derivatives of cellulosic compounds. A preferred cellulosic for cement is Walocel MW 25,000-45,000 PFV methylhydroxyethyl cellulose, manufactured by Wolff Cellulosics, a division of Bayer located in Germany. A preferred cellulosic for lime is Natrosol 210HHX manufactured by Hercules of Wilmington, Del., which is a division of Ashland Chemicals or Cellosize QP 100 MH-V manufactured by Dow Construction Chemicals of Northbrook, Ill. The hydroxylethyl cellulosic is preferred for use with lime because it is more heat resistant and does not gel at higher temperatures. While not important when using cement, the added heat resistance is an additional benefit when using lime materials.

The amount of cellulosic that is used is directly proportional to the amount of lime material that is present in the slurry. It is important to note that this is based on the gross amount of lime material present and not the amount of lime that is present in the lime material. The amount of CaO present will vary based upon the type of lime material that is being used as well as the source material. For example, not only does lime kiln dust contain less CaO than quicklime, but its amount of CaO will vary based upon the particular kiln it came from as well as the particular batch. Quicklime will have varying amounts of CaO, depending upon the source material used to create the lime material. It has been found that despite varying concentrations in CaO in various lime materials, the relative amounts of the novel slurry should be determined based upon the overall amount of the lime material instead of the amount of CaO contained within that material.

The preferred lime slurry contains from about 0.05 to about 0.15 weight percent cellulosic based upon the weight of lime material; lower amounts of cellulosic produces slurries that are too fluid and are more difficult to control (like water) while higher levels tend to gel and are not considered to be economically viable. However, in some cases it is desirable to use higher amounts of cellulosic. For example, if the slurry is going to be applied on a steep grade it may be desirable to have higher viscosity slurry so that it does not flow off the steep grade before it is mechanically mixed into the soil. This can be achieved by using more cellulosic without affecting the amount of working time available. Temperature affects the viscosity and flow properties of cement and to a degree lime materials. Temperature will play a role in determining the exact dosage of cellulosics for rheology control. The viscosity of the slurry varies with temperature; as the temperature increases the viscosity will increase. For example, the temperature change from 70 degrees F. to 90 degrees F. can have the overall effect of doubling the measured viscosity of a slurry where the amount of cellulosic and sucrose are constant. It is for that reason that slurry production in cooler temperatures will require larger amounts of thixotropic rheology control agents than at higher temperatures. This is directly related to the properties of the material itself and therefore will have to be determined on a case by case basis for each type and source of lime material used in slurry.

In certain cases, the use of a cellulosic in connection with the equipment used to manufacture commercial batches of lime slurry may result in the foaming of the lime slurry. The foaming necessitates the addition of an antifoaming/defoaming agent to the lime slurry. In contrast, laboratory scale batches of lime slurry may not require any de-foamer. The de-foamer should be inert to and not react with lime or any of the other additives that are present in the slurry. In some cases, de-foamer is already present in the commercial cellulosic material. Useful de-foamer/anti-foamer compounds include: Munzing Chemicals Agitan P-823, tributyl phosphate, Dee Fo 97-3, or other cement compatible de-foamers. Selection of the antifoaming/defoaming agent must be made carefully, as some agents, while solving the foaming issue, will create other problems with the slurry. The antifoaming/de-foaming agent preferably does not have any chemical interaction with the lime or the cellulosic compound and has no effect on the slurry other than to prevent and/or reduce the generation of foam. One currently preferred antifoaming/defoaming agent is Agitan P-823, manufactured by Ultra Additives/Munzing Chemicals, which is located in Bloomfield, N.J.

De-foamer can generally be avoided when creating the lime slurry if the lime is added to the water and sugar before being combined with the cellulosic. It is generally the presence of the cellulosic thickener in the water when the lime is being added that increases the likelihood of foaming. If the use of de-foamer is necessary, it is currently preferred that the lime slurry contain from about 0.006 to about 0.02 weight percent de-foamer. Lower amounts are not usually effective at sufficiently controlling foaming and higher amounts are not usually necessary and thus are not economically viable. However, the amount of de-foamer required will change based upon factors such as the properties of the water that is being used, the ambient temperature, the equipment used to mix the slurry, as well as the particular type and amount of cellulosic that is used. As a result, the amount of de-foamer required will vary and have to be adjusted from batch to batch of slurry. It is particularly preferred that the slurry is mixed in the manner disclosed below such that no de-foamer is required.

The reaction of lime with water to form the slurry results in the generation of heat. The slurry should be kept at a temperature below about 120° F. and preferably below about 115° F. If the slurry reaches a temperature of about 150° F., it is generally not possible to control the reaction and the temperature will continue to increase until the water boils off. It has been found that the use of a stabilizer/flow regulator such as sugar can be used to limit the temperature increase of the lime slurry during its preparation. Without being bound to any theory, it is currently believed that this is accomplished by a chemical reaction with the sugar as opposed to the mechanism it retards the setting of cement, namely by minimizing of contact and friction of particles in cement that results in setting. It is currently believed that the sugar sufficiently reduces the rate of reaction of the lime and the water so that the reaction does not completely occur until the slurry is mixed into the soil. As a result of the different purposes involved, the amount of sugar used is generally greater than the upper limit used to act as a set retarder in cement. Further, since lime compounds do not set, conventional set retarders such as sugar are generally not used in lime based compounds.

Various materials that can be used as a chemical retardant/stabilizer include but are not limited to: sucrose, "Recover" produced by Grace Chemicals located at Columbia, Md., lignosulfonates, carboxylic acids, polycarboxylic acids, whey protein, carbohydrates, oxides of lead and zinc, phosphates, magnesium salts, fluorates, and borates, ASTM C494, Type D such as Pozzolith 300-R, supplied by Master Builders BASF Admixtures of Houston, Tex., and Plastiment, supplied by Sika Corp, of Lyndhurst, N.J.

One currently preferred retardant/stabilizer used is sucrose in amounts of from about 0.01 to about 0.9 weight percent based upon the weight of the lime material in the slurry and most preferably about 0.4%. Lower amounts are not preferred because they may not sufficiently control the temperature or flow properties and higher levels may create difficulty in the suspension properties of the cellulosic. A significant portion/majority of the sucrose is preferably combined with the water prior to the addition of the lime material in order to ensure that it is available to minimize the temperature increase as the lime material is added to the water. The remainder of the sucrose may be added in combination with the cellulosic. The sucrose is used to regulate flow properties of the lime slurry in sufficient amounts to maintain flow times in API sanctioned Marsh Funnel. Flow-rate tests in API marsh Funnel tests should be greater than 50 seconds but less than 3 minutes 30 seconds, while 2 minutes is preferred.

The amount of components used in the various embodiments will vary based upon the requirements for the particular job and material being slurried. For example, different amounts of lime material may be required per unit of substrate soil to produce a treated substrate soil system having the desired properties. Further, various lime materials, such as lime kiln dust and alkaline bypass dust contain significantly less CaO than quicklime and will vary based upon the particular source or kiln from which the material was generated. Quick lime may vary in the amount of CaO present depending upon the raw material that is used. Based upon the source of the lime material and other parameters, such as how much slurry is going to be mixed in per unit of soil and the moisture requirements for the treated soil, one of skill can determine the relative percentage of lime material and water required in the slurry. Temperature will play a role in determining the exact dosage of cellulosics for rheology control. The viscosity of the slurry varies with temperature; as the temperature increases the viscosity will increase. For example, the temperature change from 70 degrees F. to 90 degrees F. can have the overall effect of doubling the measured viscosity of a slurry where the amount of cellulosic and sucrose are constant. It is for that reason that slurry production in cooler temperatures will require larger amounts of thixotropic rheology control agents than at higher temperatures. This is directly related to the properties of the material itself and therefore will have to be determined on a case by case basis for each type and source of lime material used in slurry.

The components also have an interrelated effect on the properties of the overall slurry. As a result, as the proportion of one ingredient is varied, the amounts of other ingredients must also be correspondingly adjusted. Specifically, as one increases the weight percent of lime material in the slurry, the amount of cellulosic can be slightly decreased as there is less water to be tied up. At the same time more sugar is required to be able to retard the increased amount of lime and additionally regulate flow characteristics synergistically with the cellulosic. In contrast, as you decrease the weight percent of lime in the slurry, more cellulosic is required to tie up the additional water that is in the slurry and the sugar can be slightly decreased since there is less lime to retard. Temperature affects the viscosity and flow properties of cement and to a degree lime materials.

Various embodiments of the current invention may be better understood by reference to the following examples.

Example 1

Lime kiln dust (LKD) was used to create 12.5 tons by dry weight of lime slurry in 25,000 pounds of water having 49.8% by weight lime material solids in water. Twenty four thousand pounds of water was mixed with 74.63 pounds of sugar. To this mixture, 24,875.62 pounds of LKD from a kiln in Chicago was added in thirds at about 10-20 minute intervals. To 1,000 pounds of holdback water, 49.75 pounds of a packaged admix containing a 1:1 ratio by weight of cellulosic and sugar was added. The LKD was blown into the mixing tank pneumatically. After all the LKD was added to the water, the holdback water containing the cellulosic and sugar was combined with the slurry and mixed together. The mixing was conducted using the preferred apparatus discussed below, including the use of a water eductor to introduce the cellulosic or pre-blended cellulosic sugar to the slurry mixture. After the LKD was added to the water, the packaged admix was added to the slurry through the use of a water eductor over a period of about five minutes. The slurry was mixed for an additional period of time of about five minutes and then discharged into a tanker vehicle.

This resulted in slurry having 49.8% lime material solids, 0.4% sugar by weight of the lime material and 0.1% cellulosic by weigh of the lime material. This resulted in a 50% by weight total solids in the solution and a total of 0.5% of all additives by weight of the lime material. The temperatures (in degrees Fahrenheit) were measured after the addition of each third of the LKD to the water as well as after various intervals of time after the slurry was moved to the tanker truck for delivery. The slurry was not further mixed after it was transferred to the tanker truck. The results are shown below in Table

TABLE 1

| Sample | Temperature |
|---|---|
| Batch Water | 73° |
| After ⅓ LKD | 76 |
| After ⅔ LKD | 78 |
| After all LKD | 85 |
| 10 minutes after loaded | 72 |
| 30 minutes after loaded | 77 |
| 50 minutes after loaded | 85 |

Example 2

A 12.5 ton by dry weight batch of slurry was created using the procedure identified in Example 1, except that 24,875.62 pounds of a LKD from a Kentucky kiln was used with 25,000 pounds of water to create a 49.8% by weight of lime material solids slurry; 74.63 pounds of sugar was added to the initial water batch; 49.75 pounds of a 1:1 ratio of cellulosic and sugar was mixed with 1,000 pounds of hold back water before being mixed into the slurry. This created lime/LKD slurry that was 49.8% lime material, 0.1% cellulosic by weight of the lime material, 0.4% sugar by weight of the lime material. This resulted in a 50% total solid slurry and 0.5% total additives by weight of the lime material. The results are shown below in Table 2.

TABLE 2

| Sample | Temperature |
|---|---|
| Batch Water | 72° |
| After ⅓ LKD | 73° |
| After ⅔ LKD | 73° |
| After all LKD | 77° |

Example 3

A 12.5 ton by dry weight batch of slurry was created using the procedure identified in Example 2 except that 30,423.10 pounds of a LKD from a Kentucky kiln was used with 25,000 pounds of water to create a 54.8% by weight of lime material solids slurry; 76.06 pounds of sugar was added to the initial water batch; 60.85 pounds of a 1:1 ratio of cellulosic and sugar was mixed with 1,000 pounds of hold back water before being mixed into the slurry. This created lime material slurry that was 54.8% lime material, 0.1% cellulosic by weight of the lime material, 0.35% sugar by weight of the lime material. This resulted in a 55% total solid slurry and 0.45% total additives by weight of the lime material. The results are shown below in Table 3.

TABLE 3

| Sample | Temperature |
|---|---|
| After all LKD | 86° |
| 10 minutes after loaded | 85° |
| 40 minutes after loaded | 89° |
| 60 minutes after loaded | 89° |

Example 4

A 7 ton by dry weight batch of slurry was created using the procedure identified in Example 1 except that 13,930.35 pounds of a LKD from a Kentucky kiln was used with 933.33 pounds of water to create a 59.7% by weight of lime material solids slurry; 41.79 pounds of sugar was added to the initial water batch; 27.86 pounds of a 1:1 ratio of cellulosic and sugar was mixed with 1,000 pounds of hold back water before being mixed into the slurry. This created lime material slurry that was 59.7% lime material, 0.1% cellulosic by weight of the lime material, 0.4% sugar by weight of the lime material. This resulted in a 60% total solid slurry and 0.50% total additives by weight of the lime material. The results are shown below in Table 4.

TABLE 4

| Sample | Temperature |
| --- | --- |
| Batch Water | 72 |
| After all LKD | 83 |
| 10 minutes after loaded | 85° |
| 35 minutes after loaded | 92 |

Example 5

A 15 ton by dry weight batch of slurry was created using the procedure identified in Example 1 except that 29,821.07 pounds of a LKD from an Indianapolis kiln was used with 17,619.05 pounds of water to create a 62.6% by weight of lime material solids slurry; 119.28 pounds of sugar was added to the initial water batch; 59.64 pounds of a 1:1 ratio of cellulosic and sugar was mixed with 1,000 pounds of hold back water before being mixed into the slurry. This created lime material slurry that was 62.9% lime material, 0.1% cellulosic by weight of the lime material, 0.5% sugar by weight of the lime material. This resulted in a 63% total solid slurry and 0.60% total additives by weight of the lime material. The temperature after each third of the LKD lime material was added was 65° at ⅓, 65° at ⅔ and 69° after all the lime material was added. Additional batches were prepared in the same manner to compare the consistency over time. The first two batches were prepared on the first day and batches 3-5 were prepared on the second day. The results are shown below in Table 5.

TABLE 5

| Sample | Temperature | Marsh Funnel Time |
| --- | --- | --- |
| Batch 1 | 74° | 1:45 |
| Batch 2 | 78° | 2:05 |
| Batch 3 | 72° | 2:20 |
| Batch 4 | 84° | 2:40 |
| Batch 5 | 82° | 2:35 |

In addition, LKD has been used to make slurries having solids content of 63% and as high as 65%. A lime slurry batch containing 65% solids content that was manufactured from LKD for a project in Frankfurt, Ind. had a Marsh funnel flow time of 2 minutes and 40 seconds. This shows that the material is still not yet at maximum viscosity and there is probably room to increase the solids content to close to 70% without making the material too thick to properly flow.

Based upon the above examples, it can be concluded that the slurries containing up to 70% lime material could be manufactured with an acceptable temperature rise and kept in suspension in the slurry. Each of the slurry batches from the examples could be trucked safely and delivered without the use of a recirculating pump on the delivery truck. The length of time for the production of a batch of slurry is mainly dependant upon the time necessary to blow the powdered lime material into the mixing tank. This can vary a great deal depending upon what means is employed, such as a truck blower, pig blower, or fixed blower. The pneumatic blower's ability to move larger amounts of powdered lime material shortens the overall mix time.

In addition to being used to determine if the slurry is properly homogenized, the Marsh funnel test can be used to measure whether the slurry has begun to have a solids content that is too high to flow properly, such that its ability to be used as a liquid free flowing slurry is negatively affected. In general, if after a period of time the flow time of the slurry is greater than about 6 minutes, the slurry will no longer be useful as it would be too difficult to use gravity to disperse the slurry from a truck in the normal manner. If the flow time of the slurry is greater than about 6 minutes, additional water will need to be added to the slurry in order to bring the solids content down to provide a more optimal flow rate.

A first preferred apparatus that can be used to manufacture the novel slurry is illustrated in FIGS. 1-8. The mixing station 20 is generally composed of a mixing tank 22, recirculating pump 58, injection line 26, additive batcher 28, blending tank 30, electrical box 34, and air compressor 60. Mixing station 20 can be a fixed location plant whereby the various components are constructed in a manner to remain stationary. However, as evidenced in FIGS. 1-8, mixing station 20 can also have a mobile plant configuration on trailer 36. The various components of mixing station 20 would be located on a self-contained trailer apparatus 36 to allow mixing station 20 to be moved over roads and to establish the mixing plant 20 at remote sites for the production of the aforementioned slurry mixture.

Figure 8:
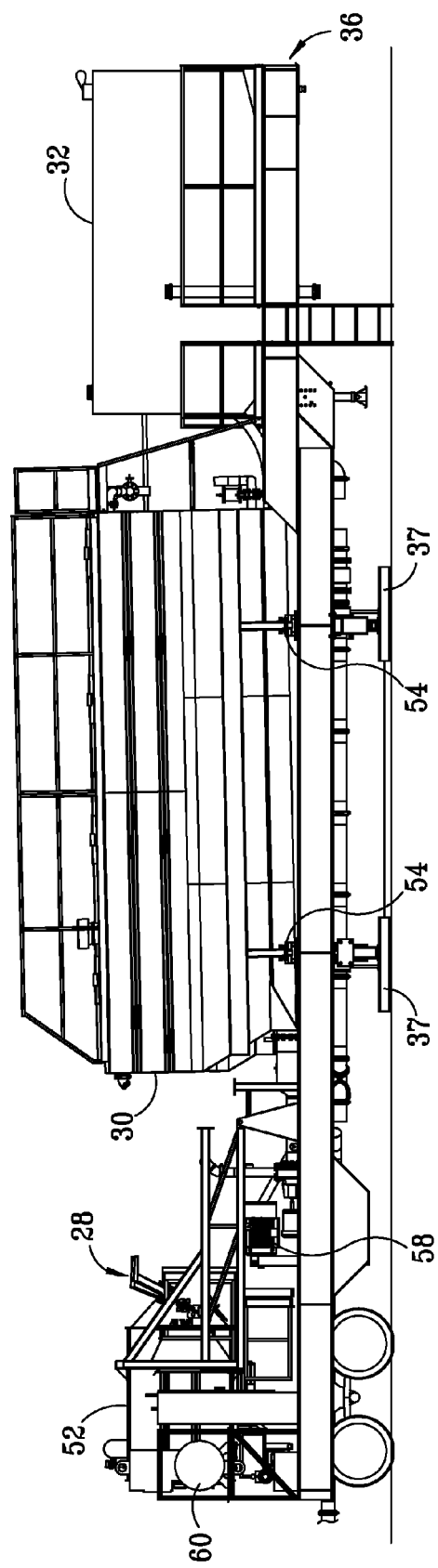
FIG. 8 is a side elevation view of the apparatus of FIG. 1 where the platform containing the additive batcher and dust collector has been placed in the lowered position.
Figure 9:
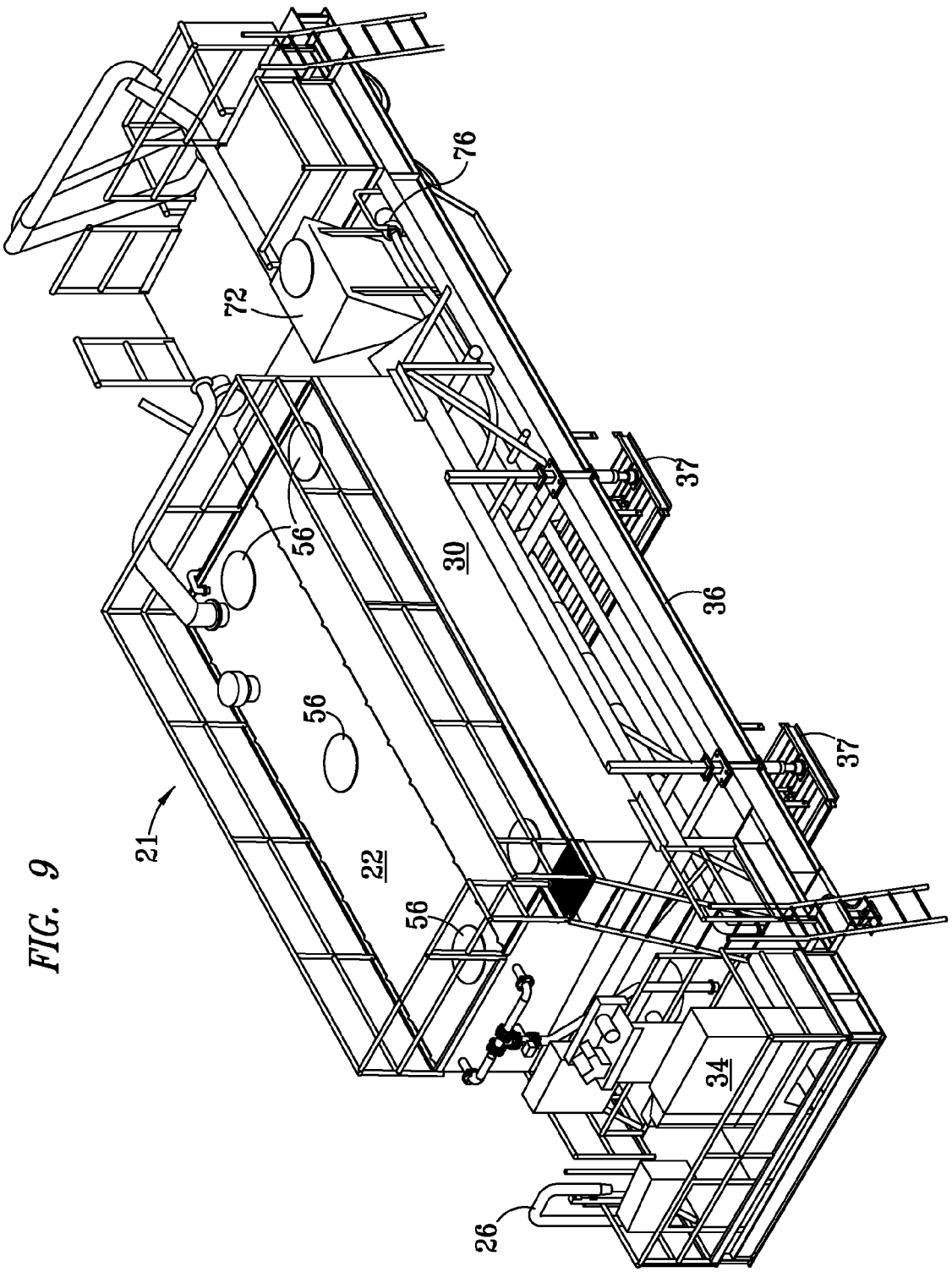
FIG. 9 is a rear perspective view of a second preferred mobile mixing apparatus that uses an eductor.
Figure 10:
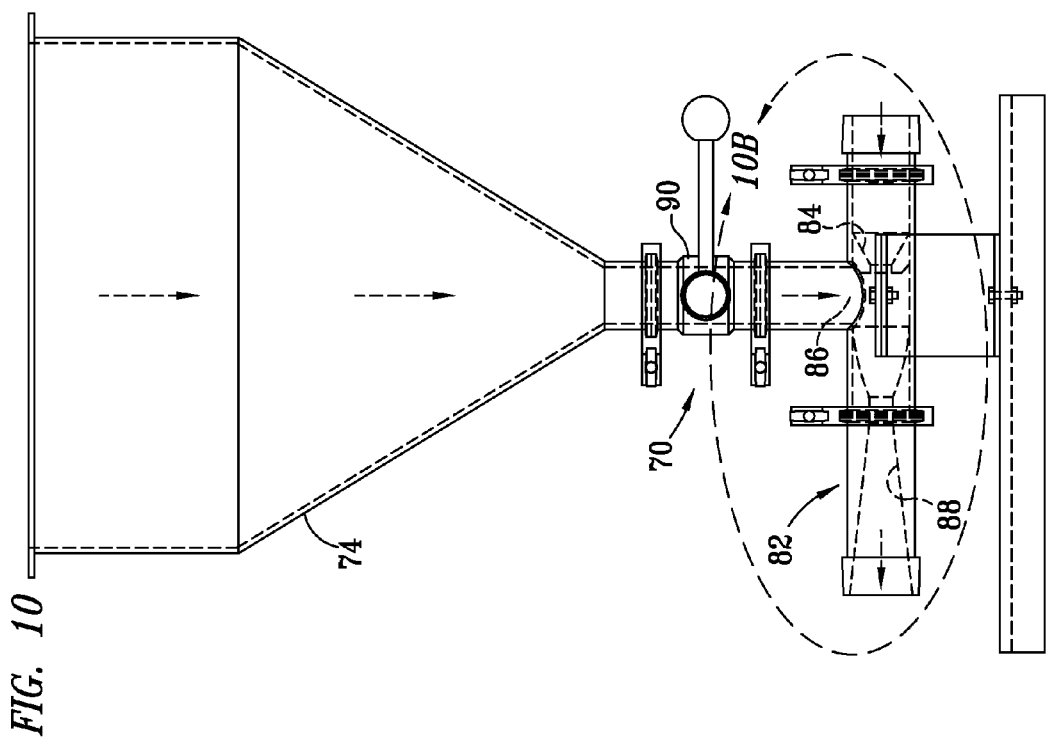
FIG. 10 is a expanded view of the eductor in the preferred mixing apparatus of FIG. 9.
Figure 10A:
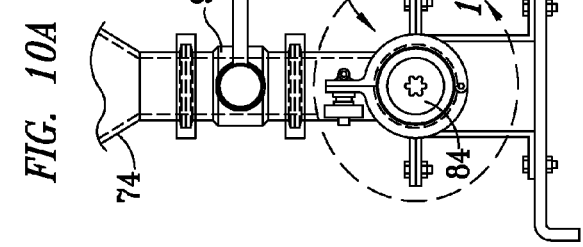
FIG. 10A is a further expanded side view of the valve and conduit portion of the eductor depicted in FIG. 10.
Figure 10C:
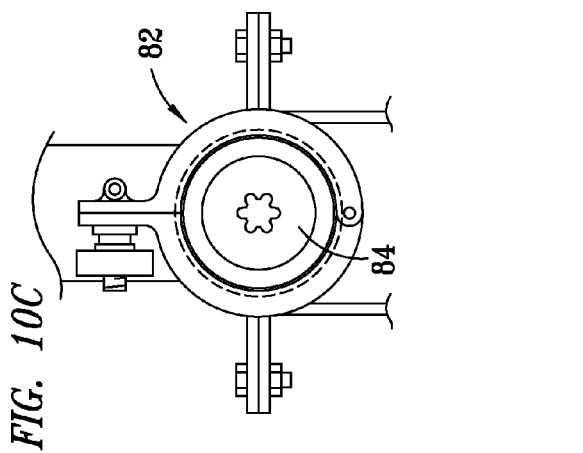
FIG. 10C is an expanded and cross sectional side view of the conduit portion of the eductor depicted in FIG. 10.
Figure 10B:
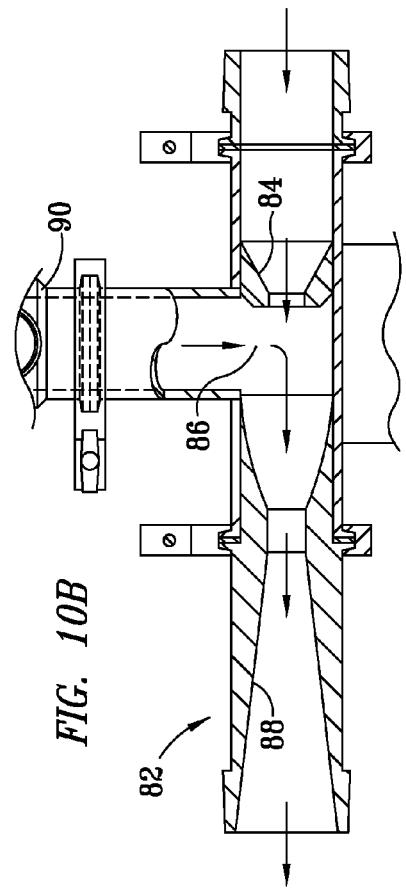
FIG. 10B is a further expanded side view of the conduit portion of the eductor depicted in FIGS. 10 and 10A.
Figure 11:
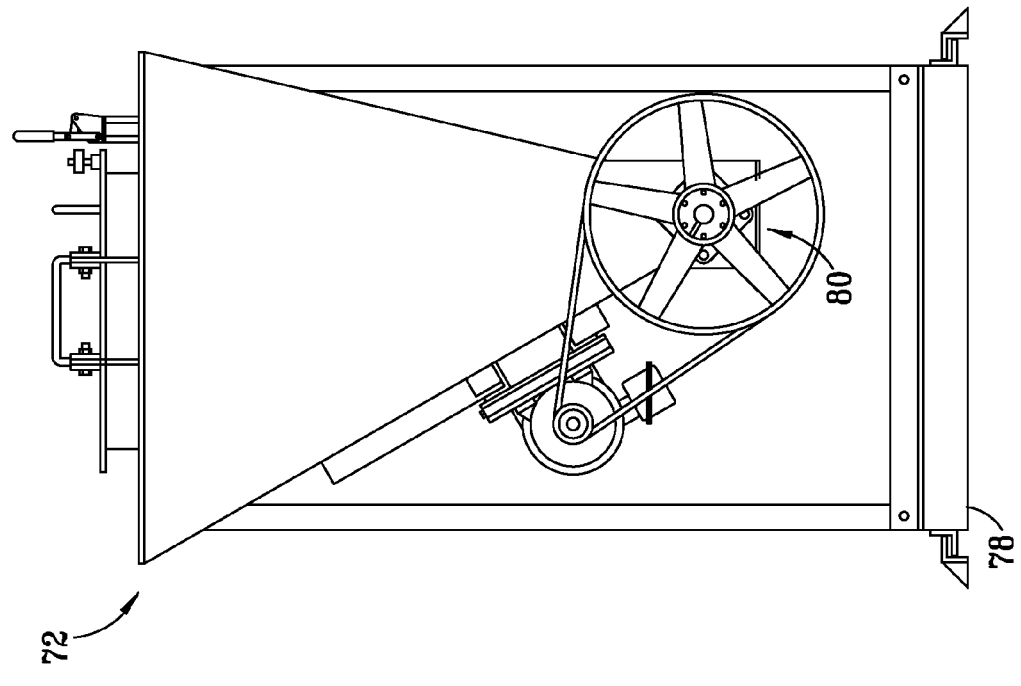
FIG. 11 is an expanded front view of the admix hopper used to add additives to the eductor in the preferred mixing apparatus depicted in FIG. 9.
Figure 12:
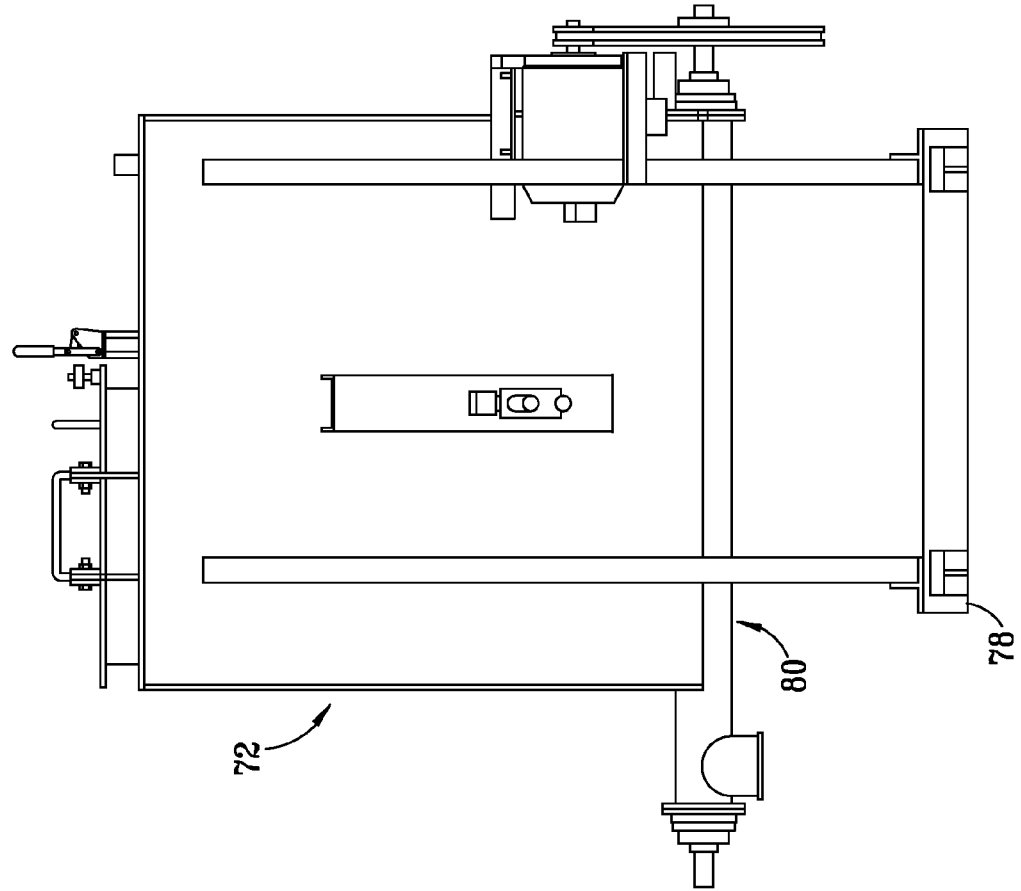
FIG. 12 is an expanded side view of the admix hopper depicted in FIG. 11.

When mixing station 20 is in its mobile plant configuration it will further contain a mobile generator 32 or power source assembly for the supply of electricity in remote locations. The trailer 36 and frame assembly would contain the structural and functional mechanisms for the unified structure of the plant and the maintenance of said structure during road movement. Hydraulic braces 37 can be used to stabilize mixing station 20 when it is not being transported. To the extent that portions of mixing station 20 would extend too high above the ground to allow trailer 36 containing mixing station 20 to travel on highways that contain overpasses, portions of mixing station 20, such as the additive batcher 28, can be stored in a lowered position and hydraulics 50 can be used to raise the portions of mixing station 20 to their operating configuration once mixing station 20 has arrived at the desired location. FIG. 8 shows mixing station 20 with additive batcher 28 and dust collector 52 in the lowered position to minimize the overall height of mixing station 20 above the road. In this manner, mixing station 20 is mobile and can be relocated to the job site where the slurry is to be used. Alternately, trailer 36 allows mixing station to be transported between various cities or other locations, allowing a single mixing station 20 to service a broader geographic region.

The preferred method of creating the slurry using mixing station 20 begins by pumping or otherwise transferring water to mixing tank 22. The amount of water is determined by the apparatus operator based upon the particular fixed cement/water or lime/water proportion required for the particular job as well as the size of the batch. The preferred cement slurry contains from about 60 to about 65 weight percent cement and the preferred lime slurry contains form about 60 to about 70 weight percent lime. Preferably a portion, such as 25%, of the total amount of water required for the particular batch of slurry is pumped into blending tank 30 instead of mixing tank 22. Load cells 46 are provided between mixing tank 22 and trailer 36 and can provide a way of determining when the appropriate amount of water has been added to mixing tank 22. Similarly, load cells 54 are provided between blending tank 30 and trailer 36 to provide a way of determining when the appropriate amount of water has been added to blending tank 30.

When manufacturing a lime slurry, it is preferred that at least a significant portion of the sugar is added to mixing tank 22 before the addition of the lime material. The remainder of the sugar stabilizer/flow regulator can be added to mixing tank 22 along with the cellulosic. This ensures that the bulk of the sugar is available to maintain the temperature of the slurry as the lime material is added to the water.

While it is possible to add the cellulosic, sugar, and antifoaming agent directly to the water in mixing tank 22, it is preferred that at least the cellulosic is separately added to a portion of water in blending tank 30. The addition of cement or lime into mixing tank 22 causes aeration and bubbling in the water that is present in mixing tank 22, especially when the cement or lime is injected through injector line 26 using a pneumatic pump. The injection of the cement or lime through injector line 26 creates microstabalized pockets of air in the slurry which aids in stabilizing the cement or lime in suspension; however, it may also cause foaming of the slurry composition. The presence of a cellulosic in the developing slurry greatly increases the amount of air entrained in the slurry as it creates microstabilized air pockets in the slurry. As a result, more anti-foaming agent is required to prevent foaming of the slurry when the cellulosic is present. Premixing the cellulosic with a portion of the water that is withheld from mixing tank 22 reduces the amount of defoamer that is required because the cellulosic is not present during the cement injection or a portion of the circulation.

In addition, recirculation pump 58 will degrade the cellulosic as it recirculates the water and cement mixture to form a homogeneous slurry. The broken down cellulosic is less effective at maintaining the cement or lime in suspension, resulting in an increased amount of cellulosic that is required. As a result, it is preferable to decrease the amount of time the cellulosic is being circulated through recirculation pump 58. By premixing the cellulosic with a portion of the water in blending tank 30 and adding the solution to mixing tank 22 only after the cement or lime and water have been mixed together, the amount of cellulosic required is kept to a minimum.

The cellulosic is contained in additive batcher 28. Additive batcher 28 adds the desired amount of cellulosic additive to blending tank 30 that contains a portion of the water required for the particular slurry batch. Preferably additive batcher 28 has a vibratory feeder that uses a vibrating tray to sift the desired amount of methylcellulose additive to blending tank 30.

Figure 2:
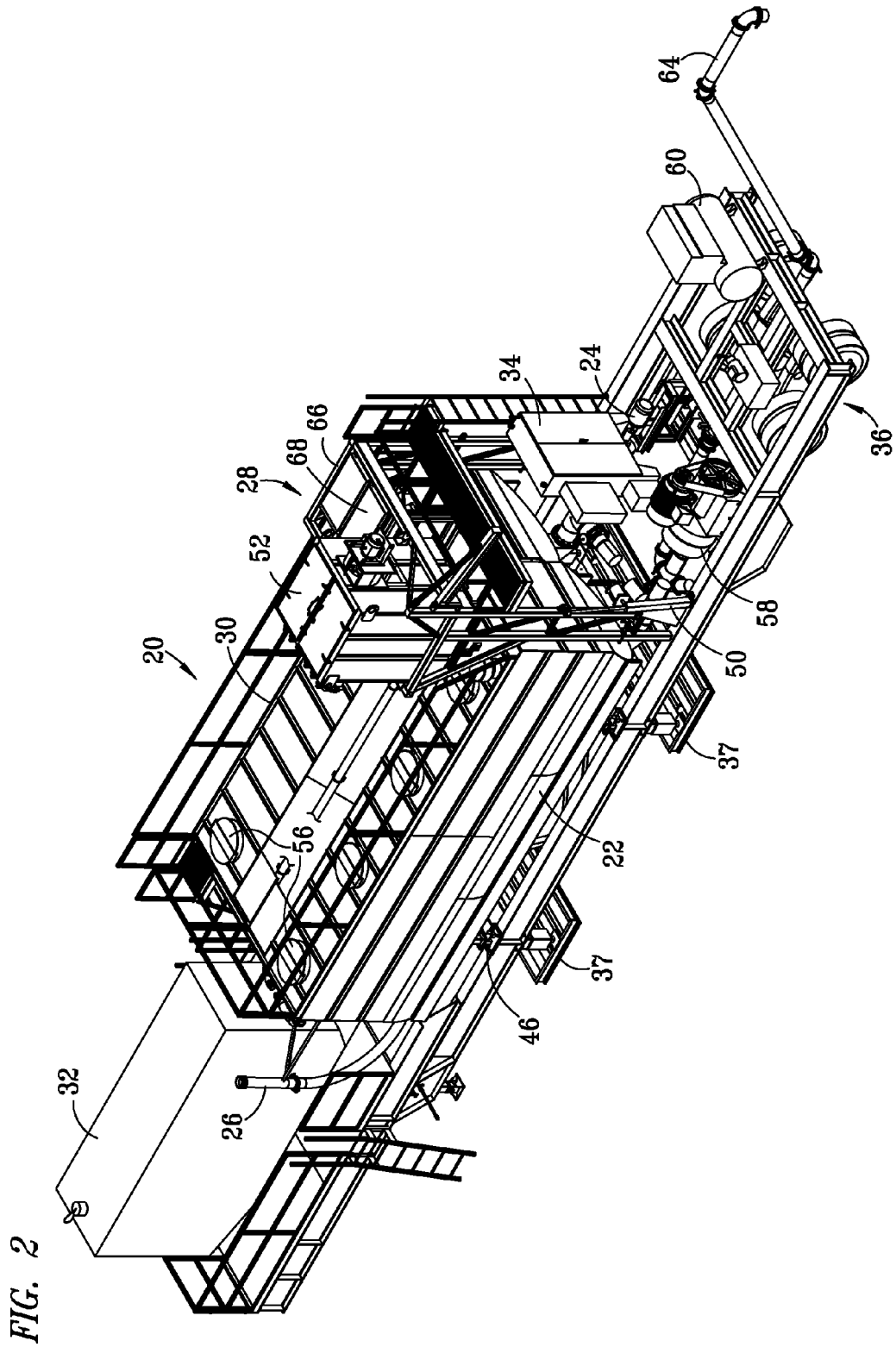
FIG. 2 is a rear perspective view of the apparatus of FIG. 1.
Figure 3:
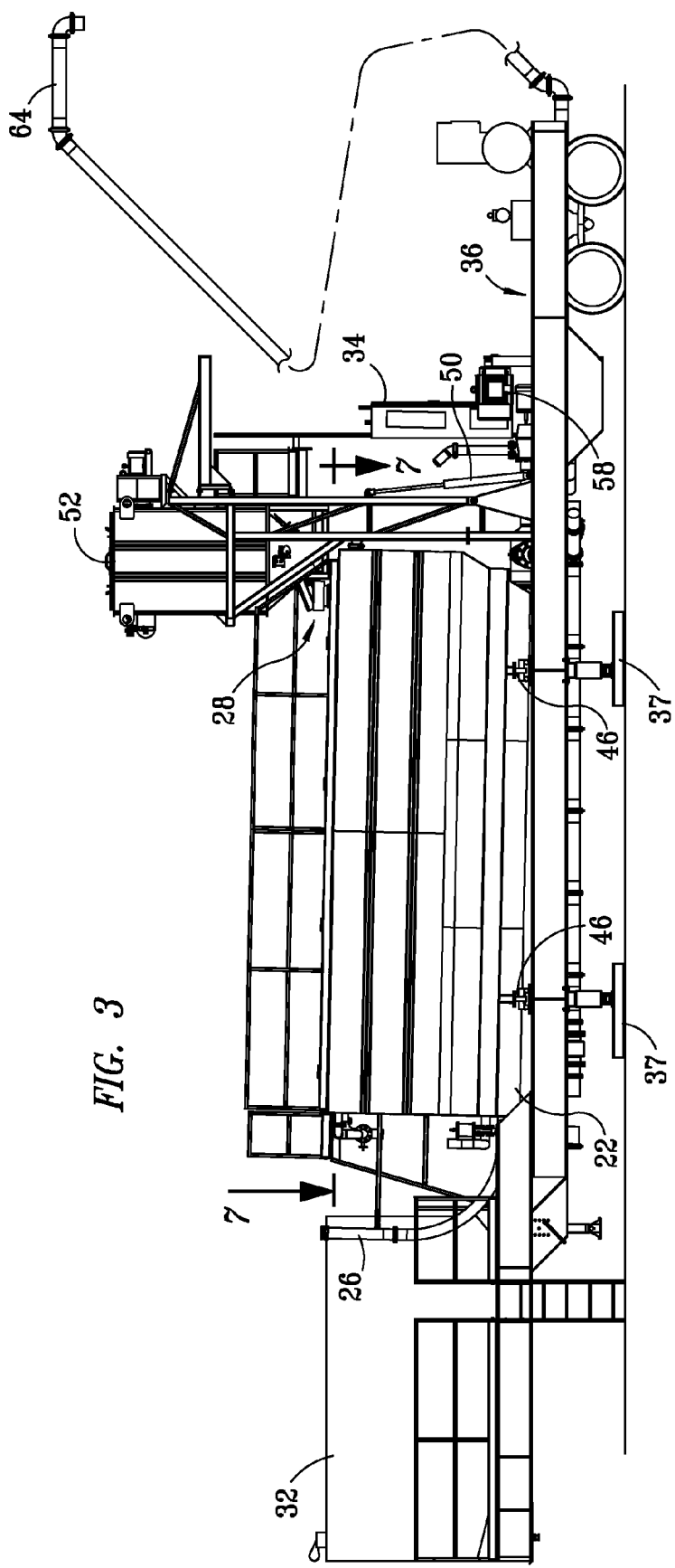
FIG. 3 is a side elevation view of the apparatus of FIG. 1.
Figure 4:
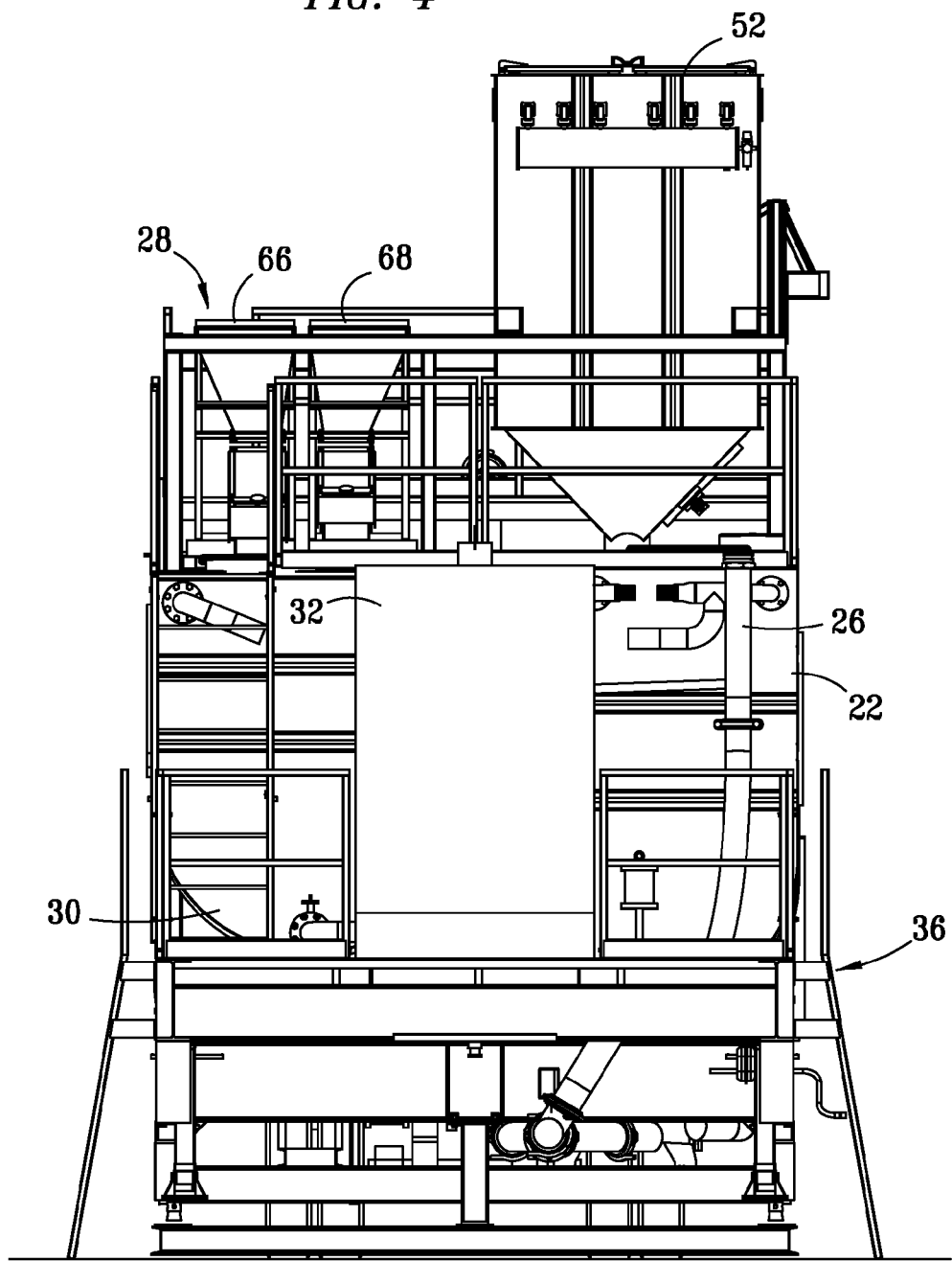
FIG. 4 is a front elevation view of the apparatus of FIG. 1.
Figure 5:
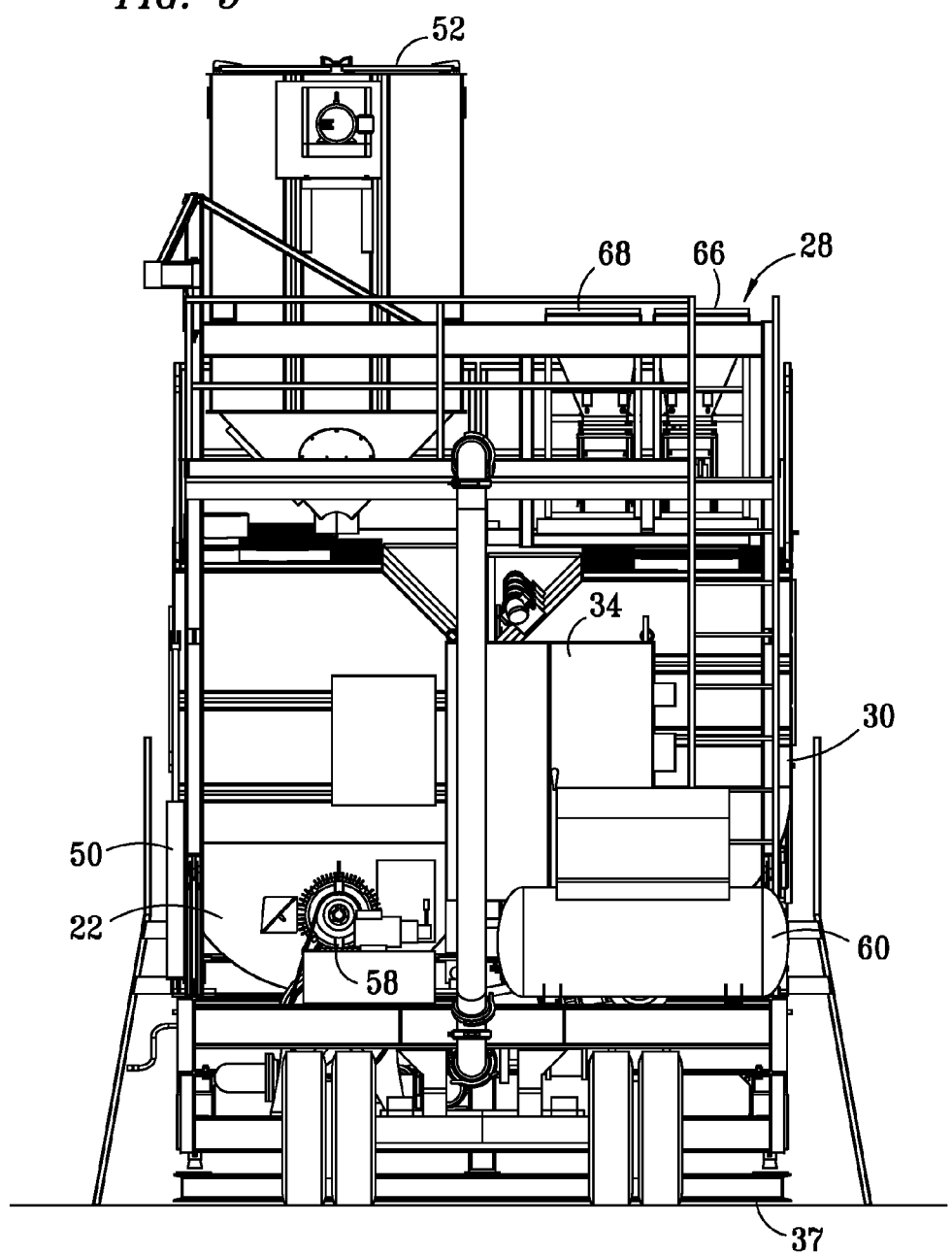
FIG. 5 is a rear elevation view of the apparatus of FIG. 1.
Figure 6:
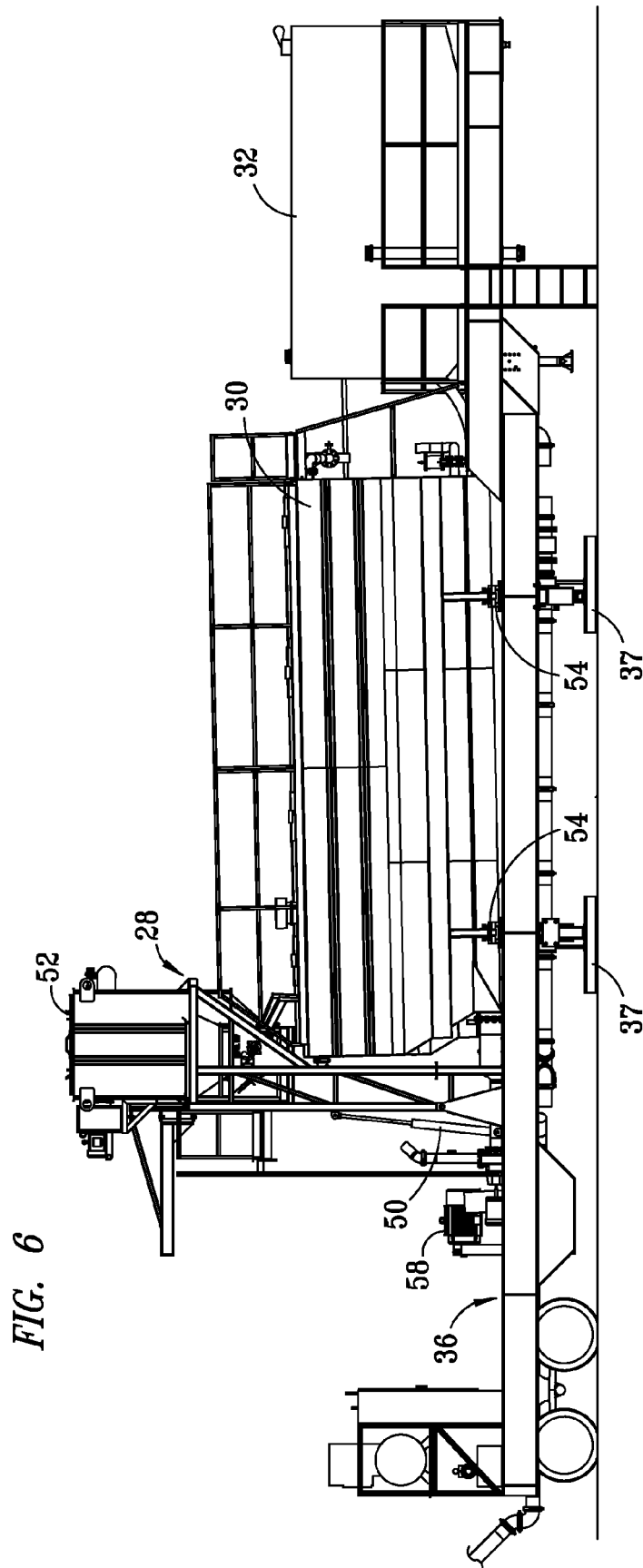
FIG. 6 is a back side elevation view of the apparatus of FIG. 1.
Figure 7:
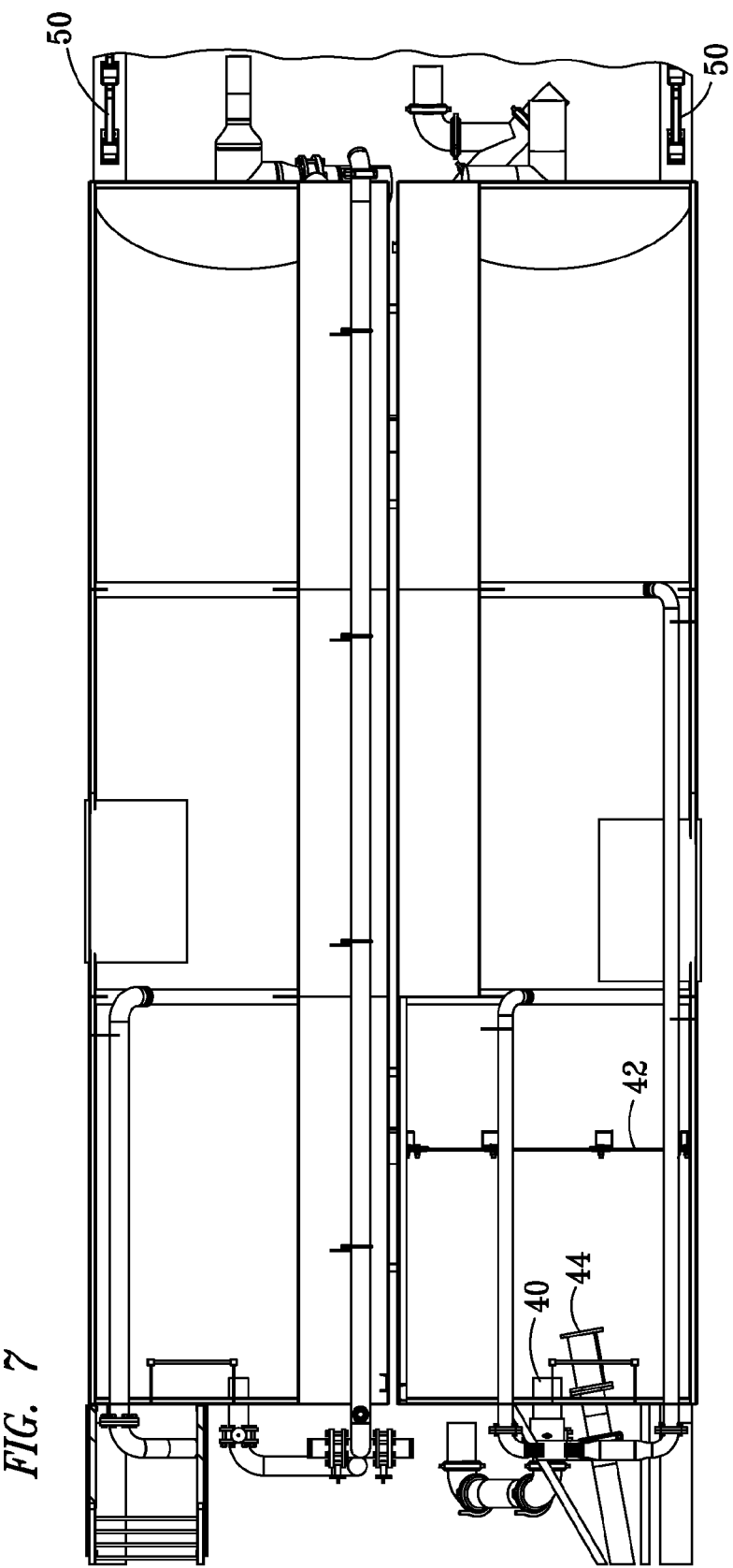
FIG. 7 is cross section view of the apparatus of FIG. 3, showing the internal structure of the various tanks.

As depicted in FIGS. 1-2 and 5, additive batcher 28 can be contain multiple compartments 66 and 68 such that additive batcher 28 can be used to add the required amount of sugar or other retardant to the water in blending tank 30 in addition to the cellulosic. For example, compartment 66 could contain the cellulosic and compartment 68 could contain sugar. In this manner the required amount of the cellulosic and the retardant can be separately measured into blending tank 30. It is currently preferred that the defoamer is added directly to mixing tank 22 via gravity feed, but a third compartment in additive batcher 28 could alternatively be used to add defoamer. Defoamer can be added directly to mixing tank 22 by hand using one of the access ports 56 or by an automated system like the way additive batcher adds cellulosic and retardant to blending tank 30. Alternatively, the sugar can be gravity fed directly into mixing tank 22 just like the defoamer and additive batcher 28 can have only a single compartment. Load cells 54 are provided between blending tank 30 and trailer 36 and can be used to measure the amount of water, cellulosic and other additives that have been added to blending tank 30. Pump 24 can be used to recirculate the water and additives in blending tank 30 to provide a homogenous mixture prior to its addition to mixing tank 22.

Once the required amount of water is added to the mixing tank 22, the operator engages the recirculating pump 58 to begin recirculation of the water in mixing tank 22. Recirculating pump 58 removes fluid from mixing tank 22 at intake 38 and reintroduces it into mixing tank 22 through nozzle 40. Nozzle 40 is located below the water level in mixing tank 22 and directs the recirculating fluid at diffusion baffle 42. Preferably recirculating pump 58 is rated to circulate the fluid in mixing tank 22 at from about 1000 to about 1800 gallons per minute, most preferably 1800 gallons per minute, and reintroduce the fluid back into mixing tank 22 at a pressure of about from about 15 to about 45 pounds per square inch, most preferably at 30 psi.

While the water is being recirculated by recirculating pump 58, any defoamer that is required is gravity fed into mixing tank 22 through one of the access ports 56.

Either following or at the same time as the defoamer is being added, powdered cement or lime is injected into injector line 26 and through nozzle 44 into mixing tank 22 below the waterline. Preferably cement or lime is injected using a pressurized pneumatic injection pump that is located on the vehicle that transported the dry cement or lime to the portable mixing station 20. The cement or lime is preferably introduced into mixing tank 22 at a pressure of about 15 to about 45 pounds per square inch and a rate of about as low as 300 pounds per minute, although rates of 1500 to 2800 pounds per minute are preferred.

The amount of cement or lime injected into the mixing tank 22 is determined by the batch size and the percentage of cement or lime specified for the batch. Again load cells 46 can be used to determine when the appropriate amount of cement or lime has been added to mixing tank 22. Injection nozzle 44 is located adjacent to recirculating nozzle 40. Like nozzle 40, nozzle 44 is located below the water line in mixing tank 22 and directs the injected cement or lime at diffusion baffle 42. As nozzles 40 and 44 are located below the waterline in mixing tank 22 they preferably contain pinch valves or other suitable structure to prevent the slurry in mixing tank 22 from entering nozzles 40 and 44 when there is no recirculation or injection occurring. While cement or lime is injected into mixing tank 22, recirculating pump 58 continues to recirculate the fluid in mixing tank 22, which contains an increasing amount of cement or lime in addition to the water. When the proper amount of cement or lime has been added to mixing tank 22, the cement or lime injector pump is shut off and the injection ends. A back flow prevention device such as a pinch valve or a tide valve is preferably present in nozzle 40 to prevent the fluid from flowing back through injector line 26.

Nozzles 40 and 44 are aimed such that the injected streams collide with each other at diffusion baffle 42. Diffusion baffle 42 detains lime or cement material particles, wets them and breaks them up as it is added to the mix water as well as the cement or lime that is being recirculated in the mix water. Diffusion baffle 42 preferably is a screen that has opening having a size in the range of about 1 to about 3 inches, most preferably about 2 inches. Larger openings in baffle 42 do not mix and break up the cement as effectively while smaller openings do not allow sufficient fluid to pass through and the pressure of the fluid and cement or lime exiting nozzles 40 and 44 may dislodge or damages baffle 42. Similarly, baffle 42 is preferably located from about 2 to about 10 feet from nozzles 40 and 44. The force from the injection nozzle and outflow nozzle created from the high flow delivered by the mixing pump and the pressure from the pneumatic driven cement or lime injection create a tremendous amount of mixing force directed against and through diffuser baffle 42. The flow of mixed/partially mixed slurry drives the dissolving cement or lime to intake 38 of recirculating pump 58. The recirculating pump 58 intake of the slurry solution continues the mixing process within the pump drive chamber. The mechanical apparatus within recirculating pump 58 that drives and moves the slurry fluid acts as a mechanical mixer blending the slurry while helping to break up any small clumps that have been taken in to recirculating pump 58.

Following the addition of the cement or lime to the mixing tank 22, any required admixtures are added to the cement slurry in mixing tank 22. During the addition of any admixtures, recirculation pump 58 contains to recirculate the slurry in mixing tank 22. As discussed above, the various admixtures including cellulosic and sugar or another agent can be added to the slurry by premixing the additives to the portion of the water that was added to the blending tank 30 instead of mixing tank 22. Once the cement or lime is completely wetted and adequately mixed with the water in mixing tank 22, the water containing the various admixtures in blending tank 30 can be added to mixing tank 22, using blending tank recirculation pump 24. The amount of all admixtures can vary depending on the need for slurry viscosity and set time. These are determined by quality control features and proximity to jobsite and logistics issues.

The admixtures added to the tank may include a retarding agent and/or a antifoaming/defoaming agent. As discussed above sugar is the preferred retarding agent and is added to mixing tank 22 in a proportion to the amount of cement or lime that is being used in the particular batch. To the extent that the admixtures are not pre-combined in blending tank 30, they are preferably gravity fed into mixing tank 22. The amounts can be determined by scales and either added manually or by mechanical means to mixing tank 22.

Recirculation of the slurry fluid via recirculation pump 58 both during and after cement or lime injection continues until a homogeneous slurry fluid is produced. Failure to achieve a homogenous slurry will result in an uneven batch of slurry where the cement or lime can prematurely settle or set in part. However, recirculation of the slurry should be kept to the minimum required to generate a homogenous slurry because additional mixing will further degrade the cellulosic and will cause the rate of reaction to increase causing heating and premature set. It is determined that the slurry is homogeneous when the cement or lime is fully suspended and there is no bleed water present.

A second especially preferred apparatus that can be used to manufacture the novel slurry uses an eductor device to replace the need for additive batcher 28 as well as the need to use a separate blending tank 30. In general, mixing station 21 of the second preferred embodiment is the same as mixing station 20 and the same reference numerals will be used to denote the same or corresponding components of mixing station 21. Generally, the use of an eductor 70 helps ensure that the cellulosic is thoroughly mixed in the slurry and does not clump or gel together as may occur if the cellulosic is added directly to mixing tank 22. The eductor 70 also helps avoid the need for the use of an anti-foaming agent.

Like the first embodiment, the mixing station 21 is generally composed of a mixing tank 22, recirculating pump 24, injector line 26, and a blending tank 30. The most significant difference is that an eductor 70 replaces the use of additive batcher 28. Like Mixing station 20, mixing station 21 can be a fixed location plant whereby the various components are constructed in a manner to remain stationary or as a mobile plant configuration on trailer 36. The various components of mixing station 21 would be located on a self-contained trailer apparatus 36 to allow mixing station 21 to be moved over roads and to establish the mixing plant 21 at remote sites for the production of the aforementioned slurry mixture. Since mixing station 21 does not contain additive batcher 28, there is no need for hydraulics 50 to be able to raise and lower the additive batcher 28 from the lowered to the raised position.

There is also less of a need for blending tank 30. However, it may still be preferably to include blending tank 30. While not necessary to pre-blend any components before being added to mixing tank 22, blending tank 30 can be used to store water for the next batch. Depending upon the source of water being used, the speed at which the necessary amount of water required for a batch is added to the mixing tank can be the limiting step in the process. In this circumstance, blending tank 30 can be filled with water for the next batch of slurry while the current batch is being mixed and loaded into a vehicle for transport and or application. This allows mixing station 21 to more quickly produce multiple batches of slurry without having to wait for a slower water supply to fill mixing tank 22 for each batch. There may be situation where a water source is available that can fill mixing tank 22 in a sufficiently short time, in that event blending tank 30 can be omitted.

The preferred method of using mixing station 21 begins by pumping or transferring water to mixing tank 22. As discussed above, the water can be provided directly from the available water source or can be transferred from blending tank 30. The amount of water is determined based upon the particular ratio of lime to water required for the batch as well as the desired size of the batch. Load cells 46 are provided between mixing station 21 and trailer 36 can be used to determine when the appropriate amount of water has been added to mixing tank 22. Sufficient water for the overall batch is withheld from mixing tank 22 in order to combine with the required additives using the eductor 70.

Once the desired amount of water for a batch has been added to mixing tank 22, recirculating pump 58 is started so as to remove fluid from mixing tank 22 at intake 38 and reintroduces it into mixing tank through nozzle 40. Nozzle 40 is located below the water level in mixing tank 22 and directs the recirculating fluid at diffusion baffle 42. Preferably recirculating pump 58 is rated to circulate fluid in mixing tank 22 at from about 1000 to about 1800 gallons per minute, most preferably 1800 gallons per minute, and reintroduces the fluid back into mixing tank 22 at a pressure from about 15 to about 45 psi, most preferably about 30 psi.

Next, powdered lime is injected into the injector line 26 and through nozzle 44 into mixing tank 22 below the water line. Nozzle 44 is next to nozzle 40 and is similarly directed at diffusion baffle 42. Preferably the lime is introduced into mixing tank 22 at a pressure of about 15 to about 45 psi and a rate as low as 300 pounds per minute, although rates of 1500 to 2800 pounds per minute are preferred. The preferred amount of lime injected into mixing tank 22 is determined by the batch size and the percentage of lime desired for the batch. The lime is preferably added to injector line 26 using a pressurized pneumatic pump associated with the vehicle that delivered the powdered lime to mixing station 21.

Following the addition of the lime material to the mixing tank 22, any required admixtures are added to the slurry in mixing tank 22 using the eductor device 70 that injects the wetted admixture through the recirculating pump 58 and into mixing tank 22. The admixture hopper 72 is on load cells 78 so that the admixture can be added to the mixing tank 22 in a proportionally controlled manner. The admixture hopper 72 can use screw drive 80 or a vibratory feeder to feed the admixture into the eductor hopper 74. The admixture hopper 72 adds the admixture to the eductor hopper 74 where the admixture enters a stream of water driven by the eductor water pump 76. The eductor water pump 76 pumps the hold back water through conduit 80. Conduit 80 has a narrowing portion 84 just before the opening 86 to the eductor hopper and then an expanding section 88. As a result, water passing through conduit 82 creates a suction force that pulls the admixture from the eductor hopper 74 into conduit 82 where it is mixed with the water. A valve 90 is used to control when admixture is added to the recirculating fluid. Conduit 82 connects with the recirculating line from pump 58 that is recirculating the developing slurry through mixing tank 22.

Preferably the admixture is a 1:1 ratio of cellulosic and sugar. The admixture is wetted and distributed in such a way that all particles of admix distribute throughout the lime slurry to achieve a homogeneous blend of all ingredients. During the addition of any admixtures, recirculation pump 58 continues to circulate the slurry in mixing tank 22. The amount of all admixtures can vary depending on the required properties of the final slurry. These are determined by quality control features and proximity to jobsite and other logistics issues.

The water used to inject the admixture through the eductor 70 is the portion of the total amount of water for the batch that was withheld and not added to mixing tank 22 initially. Pre-mixing the cellulosic and sugar with a portion of water that is withheld from mixing tank 22 after the pneumatic addition of the powder lime material reduces or eliminates the amount of de-foamer that is required because the cellulosic is not present during the injection of the lime material or a portion of the circulation; thus the pneumatic air injection does not cause foam formation in the absence of cellulosic.

More preferably, the cellulosic is separately added using a water eductor 70 directly into the recirculation line at recirculation pump 58 after the lime material has been injected into mixing tank 22. The addition of lime into mixing tank 22 may cause aeration and bubbling in the water that is present in mixing tank 22, especially when lime is injected through injector line 26 using a pneumatic pump. This action can cause foaming of the lime slurry composition. The presence of a cellulosic in the developing slurry greatly increases the amount of air that gets entrained in the slurry as it creates micro-stabilized air structures/voids in the slurry. As a result, anti-foaming agent may be required to prevent foaming of the slurry when the cellulosic is added to mixing tank 22 before the lime material. Also, the use of the water eductor 70 helps ensure that the cellulosic is thoroughly mixed in the slurry and does not clump or gel together as may occur if added directly to the mixing tank 22.

In addition, recirculation pump 58 will degrade the cellulosic to some extent as the water and lime mixture circulates. The broken down cellulosic is less effective at maintaining the lime material slurry flow properties, resulting in an increased amount of cellulosic that is required. As a result, it is preferable to decrease the amount of time that the cellulosic is in circulation and passes through recirculation pump 58. By adding the cellulosic to mixing tank 22 only after the lime material and water have been mixed together, the amount of cellulosic required is kept to a minimum.

As an alternative to using eductor water pump 76, the recirculating line can be split so that a portion of the recirculating fluid passes through conduit 82 and then rejoins the recirculating line. In this way, recirculating pump 58 can be used to move the fluid through conduit 82 and thus create the suction required to pull the admixture into the recirculating fluid without the need for a separate eductor water pump.

The admixtures added to the tank will include a retarding flow control agent and may also include an antifoaming/defoaming agent if necessary or other desired additives. As discussed above, sugar is the preferred retarding flow control agent and is added to mixing tank 22 in a proportion to the amount of lime that is being used in the particular batch. The amounts of the admixtures can be determined by scales and either added manually or by mechanical means to mixing tank 22.

Circulations of the slurry via recirculation pump 58 both during and after lime or cement material injection continues until a homogeneous slurry fluid is produced. Failure to achieve homogeneously mixed slurry will result in an uneven batch of slurry where the lime or cement can prematurely settle. However, recirculation of the slurry should be kept to the minimum required to generate homogeneously mixed slurry because additional mixing will further degrade the cellulosic. It is determined that the slurry is homogeneous when the lime or cement material is fully suspended, there is no water lime material bi-layer and there is no bleed water present.

Alternately, mixing tank 22 can be oriented vertically instead of horizontally as shown in the two preferred embodiments. The injector line 26 would be located at the top end of mixing tank 22 with diffusion baffle 42 oriented horizontal and spaced from the injector line as discussed above with respect to the first two preferred embodiments. This orientation provides the added benefit of using gravity to assist in the mixing operation. An eductor 70 is still preferably used to combine the cellulosic and other additives with the blending water. The water is added to mixing tank 22 via nozzle 40. Ideally, the size of mixing tank 22 as well as the other structural aspects of the mixing station 21 can be optimized such that the slurry is sufficiently homogeneous by the time it reaches intake 38 at the bottom of mixing tank 22. This would allow the mixing process to be used on a continuous instead of a batch basis to increase the amount of slurry that is produced provided that a source is available that can provide sufficient water to be continuously added to mixing tank 22.

Regardless of the mixing apparatus embodiment that is used, the flow properties of the slurry provide indirect evidence of the complete suspension of the cement or lime. When a 32 ounce sample of the cement slurry takes about 1 minute and 30 seconds to pass through an API flow cone, it is generally considered homogenous. When a 32 ounce sample of the lime slurry takes about 2 minute to pass through a Marsh funnel, it is generally considered homogeneous and the lime material is sufficiently suspended in the water. If the flow rate is too high, which for lime slurry is over about 6 minutes, the slurry is inefficiently viscous and will create problems when being discharged and applied to the soil. If the flow time is too low, the cement or lime is not sufficiently suspended in the water. In general, this is achieved by running recirculation pump 58 for a period of about 2 to about 20 minutes following the addition of the additives and water from blending tank 30 or from eductor 70.

When the slurry is determined to be mixed properly and thoroughly a transfer valve (which is part of pump 58) is opened and the slurry is pumped using recirculating pump 58 through the slurry outlet pipe 64 into a waiting vehicle for transportation to and dispersion at the delivery site. Additional water can then be added to the mixing tank 22 to start a new batch of slurry. The control features can be either manual or automated to perform the necessary movements of valves or adjustments of amounts.

The novel slurry can be delivered to the site where it will be used in a modified tanker truck. A tanker truck can be modified to transport and deliver the slurry by including a spreader bar to disperse the slurry evenly over the soil to be stabilized. This is similar to the type of vehicle used to distribute other lime products over the ground by various lime manufacturers. While no recirculation pump is required to transport the novel slurry, it has been found that the kinetic energy supplied to the slurry as a result of the slurry being transported to the site where it will be used helps to keep the lime in suspension during transport.

The novel slurry has numerous advantages over slurries that have been previously known. Amounts of lime material up to about 70 weight percent and amounts of cement up to about 65 weight percent can be suspended in water for just about as long as is desired. Even when placed on dry sand, moisture from the slurry does not evaporate or seep into the substrate soil to any noticeable extent until the slurry is mechanically mixed into the soil. Without being bound to any theory, it is currently believed that the cellulosic effectively forms a polymer film on the slurry that prevents the water from entering the soil or evaporating. The high energy mechanical mixing of the slurry into the substrate soil breaks up this surface allowing the slurry to mix and react with the soil like ordinary cement or lime. This aspect gives the operator a larger window after the slurry is laid down on the substrate soil before it must be mechanically mixed into the soil.

The use of the novel slurry also allows the operator to prevent the moisture level of the substrate that is to be stabilized from getting too high as was the case with prior slurries that contained lower proportions of cement or lime. This is because the higher proportions of lime or cement in the slurry mean that less water is added to the substrate in order to deliver the required amount of lime or cement for the particular application. With less water being added as part of the slurry, the operator has more control over the moisture level of the substrate, which should be in a particular desired range in order to provide the best results.

The above descriptions of certain embodiments are made for the purposes of illustration only and are not intended to be limiting in any manner. Other alterations and modifications of the preferred embodiment will become apparent to those of ordinary skill in the art upon reading the disclosure, and it is intended that the scope of the invention disclosed herein be limited only by the broadest interpretation of the appended claims to which the inventor is legally entitled.

What is claimed is:

1. A lime slurry comprising:
   from about 45 to about 70 weight percent lime material;
   from about 55 to about 30 weight percent water;
   sucrose in an amount sufficient to prevent the temperature from exceeding about 120° F. while maintaining the a flow time of 2 minutes through the API Marsh funnel of 32 ounces of lime material slurry;
   a thixotropic agent in an amount sufficient to achieve the flow time of 2 minutes through the API Marsh funnel of 32 ounces of lime material slurry;
   micro-stabilized pockets of air;
   wherein the slurry is adapted to be mixed into a substrate to form a stabilized substrate.

2. The slurry of claim 1 wherein the lime material is selected from the group consisting of quick lime, hydrated lime, lime kiln dust, alkaline bypass dust, and combinations thereof.

3. The slurry of claim 1 comprising from about 60 to about 70 weight percent lime material.

4. The slurry of claim 1 wherein the thixotropic agent is selected from the group consisting of methylhydroxyethyl cellulose, hydroxyl-ethyl cellulosic, cellulose ethers, and derivatives and combinations thereof.

5. The slurry of claim 1 wherein the thixotropic agent is hydroxyl-ethyl cellulosic.

6. The slurry of claim 1 wherein the retarder is sucrose.

7. The slurry of claim 6 wherein the amount of sucrose is from about 0.01 to about 0.9 weight percent by weight of lime material.

8. The slurry of claim 1 wherein the slurry has a flow time between 1.5 minutes and 6 minutes for 32 ounces of slurry through a Marsh funnel.

9. A lime slurry comprising:
   from about 45 to about 70 weight percent lime material;
   from about 55 to about 30 weight percent water;
   sucrose in an amount sufficient to prevent the temperature from exceeding about 120° F. while maintaining the a flow time of 2 minutes through the API Marsh funnel of 32 ounces of lime material slurry;
   a cellulose-containing thixotropic agent in an amount sufficient to achieve the flow time of 2 minutes through the API Marsh funnel of 32 ounces of lime material slurry;
   micro-stabilized pockets of air;
   wherein the slurry is adapted to be mixed into a substrate to form a stabilized substrate.

10. The slurry of claim 9 wherein the lime material is selected from the group consisting of quick lime, hydrated lime, lime kiln dust, alkaline bypass dust, and combinations thereof.

11. The slurry of claim 9 comprising from about 60 to about 70 weight percent lime material.

12. The slurry of claim 9 wherein the thixotropic agent is selected from the group consisting of methylhydroxyethyl cellulose, hydroxyl-ethyl cellulosic, cellulose ethers, and derivatives and combinations thereof.

13. The slurry of claim 9 wherein the thixotropic agent is hydroxyl-ethyl cellulosic.

14. The slurry of claim 9 wherein the retarder is sucrose.

15. The slurry of claim 14 wherein the amount of sucrose is from about 0.01 to about 0.9 weight percent by weight of lime material.

16. The slurry of claim 9 wherein the cellulose-containing thixotropic agent is from about 0.01 to about 0.25 weight percent by weight of the lime material.

17. The slurry of claim 16 wherein the cellulose-containing thixotropic agent is from about 0.01 to about 0.25 weight percent by weight of the lime material.

18. The slurry of claim 9 wherein the lime material is about 60 weight percent and the cellulose-containing thixotropic agent is from about 0.05 to about 0.15 weight percent by weight of the lime material.

19. The slurry of claim 14 wherein the amount of sucrose is about 0.05 weight percent by weight of lime.

20. The slurry of claim 9 wherein the slurry has a flow time between 90 seconds and 6 minutes for 32 ounces of slurry through an API flow cone.

21. The slurry of claim 9 wherein:
   the lime material is from about 60 to about 70 weight percent;
   the water is from about 40 to about 30 weight percent;
   the cellulose-containing thixotropic agent is methyl-hydroxy-ethyl cellulose and is from about 0.05 to about 0.15 weight percent by weight of the lime; and the retarder is sucrose and the sucrose is from about 0.01 to about 0.9 weight percent by weight of lime.

22. The slurry of claim 21 wherein:
the lime is about 60 weight percent;
the water is about 40 weight percent;
the methylhydroxyethyl cellulose is about 0.07 weight percent by weight of the lime; and
the sucrose is about 0.5 weight percent by weight of lime.

23. The slurry of claim 22 wherein the slurry has a flow time between 2 minutes and 6 minutes for 32 ounces of slurry through an API flow cone.

24. A method of forming a lime stabilized composition comprising the steps of:
providing a substrate;
adding to the substrate a lime slurry comprising,
from about 45 to about 70 weight percent lime material,
from about 40 to about 30 weight percent water,
an amount of sucrose in an amount sufficient to prevent the temperature from exceeding about 120° F. while maintaining the a flow time of 2 minutes through the API Marsh funnel of 32 ounces of lime material slurry; and
a thixotropic agent in an amount sufficient to achieve the flow time of 2 minutes through the API Marsh funnel of 32 ounces of lime material slurry;
micro-stabilized pockets of air;
wherein the slurry is adapted to be mixed into a substrate to form a stabilized substrate;
mechanically mixing the slurry into the substrate; and
grading and compacting the soil and slurry mixture.

25. The method of claim 24 wherein the lime is selected from the group consisting of quick lime, hydrated lime, lime kiln dust, alkaline bypass dust, and combinations thereof.

26. The method of claim 24 wherein the substrate is selected from the group consisting of soil, aggregate, asphalt, reclaimed aggregate, reclaimed asphalt, and mixtures thereof.

27. The method of claim 24 wherein the slurry comprising from about 60 to about 70 weight percent lime material.

28. The method of claim 24 wherein the cellulose-containing thixotropic agent is selected from the group consisting of methylhydroxylethyl cellulose, hydroxyethyl cellulosic, cellulose ethers, and derivatives and combinations thereof.

29. The method of claim 28 wherein the cellulose-containing thixotropic agent is hydroxyethyl cellulosic.

30. The method of claim 24 wherein the cellulose-containing thixotropic agent is from about 0.05 to 0.15 weight percent by weight of the lime material.

31. The method of claim 30 wherein the cellulose-containing thixotropic agent is about 0.5 weight percent by weight of the lime material.

32. The method of claim 24 wherein the retarder is sucrose.

33. The method of claim 32 wherein the amount of sucrose is from about 0.01 to about 0.9 weight percent by weight of the lime material.

34. The method of claim 33 wherein the amount of sucrose is about 0.5 weight percent by weight of the lime material.

35. The method of claim 24 wherein the slurry has a flow time between 90 seconds and 6 minutes for 32 ounces of slurry through an API flow cone.

36. The method of claim 24 wherein:
the lime is from about 60 to about 70 weight percent;
the water is from about 40 to about 30 weight percent;
the cellulose-containing thixotropic agent is hydroxyethyl cellulosic and is from about 0.05 to about 0.15 weight percent by weight of the lime material;
the sucrose is from about 0.01 to about 0.9 weight percent by weight of the lime material; and
the substrate is selected from the group consisting of soil, aggregate, asphalt, reclaimed aggregate, reclaimed asphalt, and mixtures thereof.

37. The method of claim 36 wherein:
the lime is about 60 weight percent;
the water is about 40 weight percent;
the methylhydroxyethyl cellulose is about 0.07 weight percent by weight of the lime material; and
the sucrose is about 0.5 weight percent by weight of the lime material.

38. A method of forming a lime slurry comprising the steps of:
providing water in an amount of from about 55 to about 30 weight percent of the slurry;
adding to the water an amount of sucrose sufficient to prevent the temperature from rising above about 120° F. and mixing the resulting solution;
after adding the sucrose, adding a lime material to the water in an amount from about 45 to about 70 weight percent of the slurry and mixing the resulting slurry; and
after adding the lime, adding a cellulose-containing thixotropic agent sufficient to maintain the lime material in suspension for a predetermined period of time and mixing the resulting slurry.

39. The method of claim 38 wherein the lime is selected from the group consisting of quick lime, hydrated lime, lime kiln dust, alkaline bypass dust, and combinations thereof.

40. The method of claim 38 wherein the slurry comprising from about 60 to about 70 weight percent lime material.

41. The method of claim 38 wherein the cellulose-containing thixotropic agent is selected from the group consisting of methylhydroxylethyl cellulose, hydroxyethyl cellulosic, cellulose ethers, and derivatives and combinations thereof.

42. The method of claim 41 wherein the cellulose-containing thixotropic agent is hydroxyethyl cellulosic.

43. The method of claim 38 wherein the cellulose-containing thixotropic agent is from about 0.05 to 0.15 weight percent by weight of the lime material.

44. The method of claim 43 wherein the cellulose-containing thixotropic agent is about 0.5 weight percent by weight of the lime material.

45. The method of claim 38 wherein additional sucrose is added along with the thixotropic agent.

46. The method of claim 45 wherein the amount of sucrose is from about 0.01 to about 0.9 weight percent by weight of the lime material.

47. The method of claim 46 wherein the amount of sucrose is about 0.5 weight percent by weight of the lime material.

48. The method of claim 38 wherein:
the lime material is from about 60 to about 70 weight percent;
the water is from about 40 to about 30 weight percent;
the cellulose-containing thixotropic agent is hydroxyethyl cellulosic and is from about 0.05 to about 0.15 weight percent by weight of the lime material; and
the sucrose is from about 0.01 to about 0.9 weight percent by weight of the lime material.

49. The method of claim 48 wherein:
the lime is about 60 weight percent;
the water is about 40 weight percent;
the methylhydroxyethyl cellulose is about 0.07 weight percent by weight of the lime material; and
the sucrose is about 0.5 weight percent by weight of the lime material.

50. The method of claim 38 wherein a portion of the retarder is added along with the cellulose-containing thixotropic agent.

51. The method of claim 38 wherein the mixing is accomplished using a recirculation pump and line and the cellulose-containing thixotropic agent is added to the slurry using a water eductor into the recirculation line.

* * * * *